(12) United States Patent
Host

(10) Patent No.: US 7,418,088 B2
(45) Date of Patent: Aug. 26, 2008

(54) MONITORING AND CONTROL MODULE

(75) Inventor: Lawrence William Host, Jemez Springs, NM (US)

(73) Assignee: Tierra Telecom, Inc., San Diego, CA (US)

( * ) Notice: Subject to any disclaimer, the term of this patent is extended or adjusted under 35 U.S.C. 154(b) by 952 days.

(21) Appl. No.: 10/890,487

(22) Filed: Jul. 14, 2004

(65) Prior Publication Data

US 2004/0258226 A1  Dec. 23, 2004

Related U.S. Application Data

(63) Continuation of application No. 09/677,776, filed on Oct. 3, 2000, now abandoned.

(51) Int. Cl.
*H04M 11/00* (2006.01)
*G06F 15/173* (2006.01)

(52) U.S. Cl. ............................. 379/106.01; 379/106.04; 379/90.01; 370/352

(58) Field of Classification Search ............... 379/90.01, 379/93.05, 102.01–102.05, 106.01, 106.04, 379/9, 9.01, 9.02, 9.03, 14, 14.01; 340/506, 340/825.36; 700/244; 702/56–60; 370/352–356; 709/224, 223
See application file for complete search history.

(56) References Cited

U.S. PATENT DOCUMENTS 5,719,563 A * 2/1998 Thompson, Jr. ........ 340/870.02
6,510,203 B1 * 1/2003 Onweller et al. ............... 379/9

* cited by examiner

*Primary Examiner*—Melur Ramakrishnaiah
(74) *Attorney, Agent, or Firm*—The Nath Law Group; Robert P. Cogan

(57) ABSTRACT

A method and apparatus for monitoring and controlling one or more aspects of one or more communication devices. In one embodiment the communication device is configured to transmit and receive packets of data via a packet-switched network. In one configuration the monitoring and controlling is performed by a command and control system (C/C system) that is configured to operate in conjunction with a communication device. In one configuration the communication device comprises an Interface device configured to Interface a voice communication network with a packet switched network. The C/C system may be configured to monitor or control aspects of the communication device including temperature, cooling device operation, security, drive operation, power supply output and power supply routing, system re-boots, or any other aspect of device operation. In one configuration the C/C system Interfaces with a remote location via a communication link, such as a packet switched network. Monitoring and control of various systems can be achieved from the remote location.

14 Claims, 23 Drawing Sheets

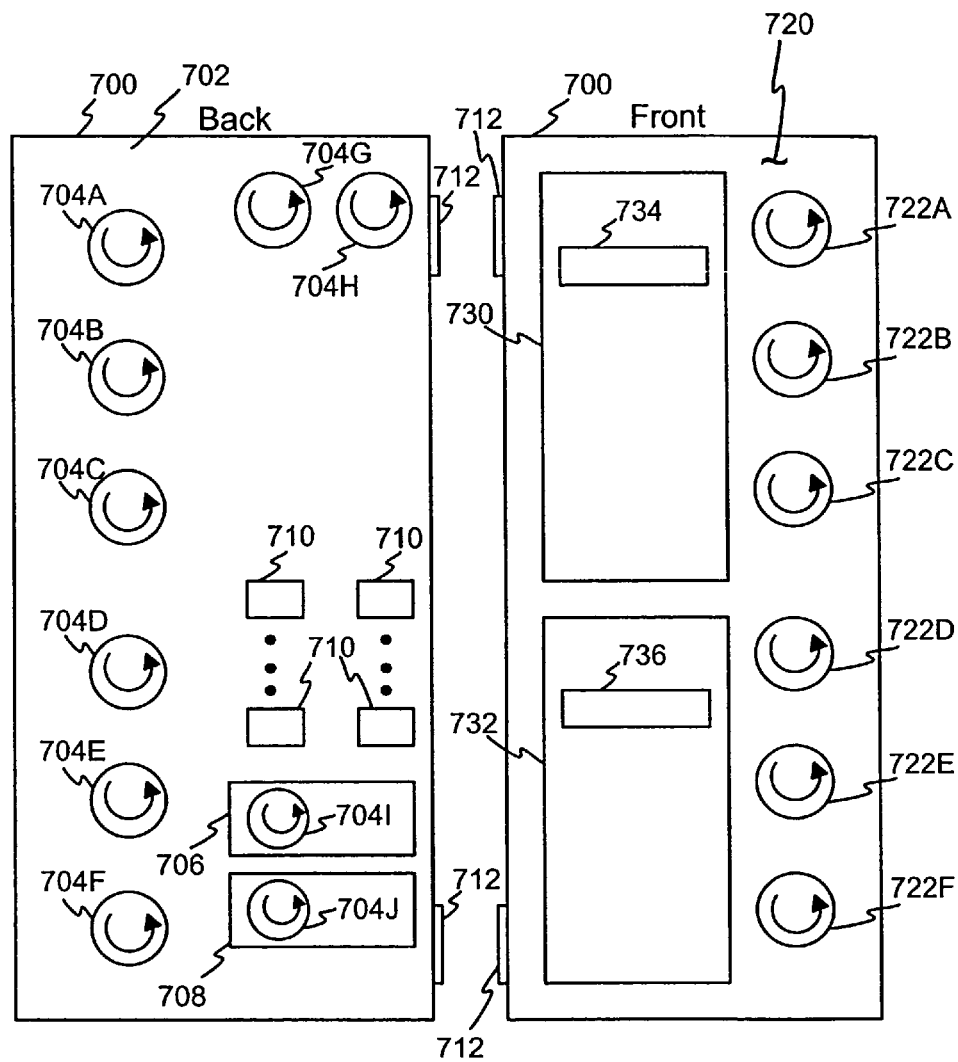

MONITORING AND CONTROL MODULE

CROSS REFERENCE TO RELATED APPLICATIONS

This application is a continuation of and claims priority from application Ser. No. 09/677,776, filed Oct. 3, 2000, now abandoned the contents of which are incorporated herein by reference.

FIELD OF THE INVENTION

The present invention relates generally to voice encoded communications and in particular to a method and apparatus for monitoring and controlling a communication device.

BACKGROUND OF THE INVENTION

The worldwide demand for communication capability continues to increase due to the advancement of areas undeveloped previously and the growth and expansion of businesses in already established areas. Moreover, homes or offices previously equipped with a single telephone line are now more likely to install two or even three lines to facilitate simultaneous communication by individuals or devices within the home or office.

At the same time, competition between long distance carriers has increased thereby reducing profitability in providing traditional long distance telephone service. There are also few market entrants due to this reduced rate of return in exchange for the large capital investment required to build out complex worldwide telephone transmission facilities. This further limits competition.

As is commonly understood, a caller intending to place a call, such as for example, a call from the West coast to the East coast utilizes traditional POTS to facilitate the call. As shown in FIG. 1, a caller utilizes a telephone 120 to gain dial-tone from a central office 122. One or more central offices serve a plurality of customers within a local access transport area (LATA) 140. The central office 122 provides dial tone to the caller. Upon receiving a request for a call, the central office decodes the dialed numbers. In this example the central office 122 detects a long distance call to a distant location and accordingly forwards the call to a toll office 126 to complete the call. The central office and toll office determine the long distance service provider associated with the caller and initiate proper billing and responsibility for the call. The toll office utilizes SS7 signaling on lines 130 to setup the communication channel to one or more other toll offices 132. As is known by those of ordinary skill in the art, SS7 or other similar signaling utilizes common channel signaling (CCS) to first obtain and dedicate voice trunks 130 to the dialed number via a second toll office 132, a second central office 142 to a remote telephone 144. After SS7 establishes a completed path of voice trunks to the dialed number, it activates the voice trunks, initiates the ring process of the dialed number and drops off the call to assist establishment of another call. It should be noted that after the SS7 dedicates the voice trunks and activates the voice channel, its interaction with the call is over and the call proceeds as a standard direct connection between two remote terminals. In this manner, the exchange of conversation or data may occur.

In many calls determined to be long distance, which is to say calls out of a LATA area 140, the call crosses one or more LATA lines 124. A LATA (Local Access and Transport Area) line 124 comprises a dividing line between one of the 196 arbitrarily designated zones in which a local telephone company, such as a Local Exchange Carrier, may originate and complete telephone calls. Calls that cross a LATA line have historically been required to be handled by a long distance telephone company, such as AT&T, MCI, or Sprint.

While such systems served their purpose well, the increased demand for telecommunication services has placed greater demands on the existing system. One drawback of the present telecommunication system operating under the SS7 standard is the poor utilization of available bandwidth on an active voice trunk. Once the prior art system establishes a voice channel, that particular voice channel is dedicated to a single particular conversation. Such a method of operation poorly utilizes voice channels, voice being a data stream in which long periods of silence occur and only requires limited bandwidth and which is greatly compressible.

Another drawback of prior art systems is the high cost of adding additional resources. To add additional voice channels additional cables must be installed and expensive equipment utilized to facilitate communication over each of the one or more newly installed cables. These costs can be substantial.

A further disadvantage to such prior art systems is their congregation in the control of a few large and powerful corporations. These corporations control the market on calls which must cross LATA lines because they have the facilities to complete these calls. For example, a telephone line subscriber may designate one of numerous small to mid-sized long distance carriers as the long distance service provider for a telephone line. The subscriber may select a particular carrier for any reason such as price, advertising, or other incentive. However, these long distance carriers are often organizations without actual long distance capability and hence must purchase long distance access in bulk from one of the large long distance service providers to complete calls that cross a LATA boundary. Because the large long distance service providers control the market, the small to mid-sized carrier may be forced to pay higher rates than the large long distance service providers. This is yet another factor that limits competition.

Yet another drawback to the prior art system of providing long distance communication service is one or more governmental fees that may be imposed as a result of governmental regulation.

While existing prior art systems could be expanded, such expanded systems would undesirably suffer from the drawbacks described above.

In response to these and other drawbacks, other methods and apparatuses have been proposed to facilitate local and inter-LATA communications. One such proposal is to transmit voice information in data packets, utilized by a packet-switched network, such as the Internet. As also shown in FIG. 1, the central office 122 may connect to an Internet Service Provider (ISP) which in turn connects to a worldwide configuration of computers 150. One example of such a worldwide configuration of computers is the Internet 150. In such a system a user at a first computer terminal 156 would dial-up an ISP 152 via a central office 122 in a manner known in the art. The first computer terminal 156 includes software and a voice input device to transform speech data to data in the form of data packets as is commonly utilized in an IP packet-switched network. The first computer terminal 156 transmits these packets to the ISP 152 wherein the packets are further transmitted via the Internet 150 to a second ISP 154 and then on to a computer terminal 158. Software and hardware on the second computer terminal 158 decode the incoming packets and regenerate a speech signal intended to resemble the original signal from a user at the first computer terminal 156. Conversation or other types of real time data exchange between parties is proposed to occur in this manner. This type of system is often referred to as voice-over-IP communication. Indeed, an entire standard has been dedicated to voice-over-IP, commonly referred to as H.323.

The voice-over-IP method of the prior art and the H.323 standard also suffer from numerous disadvantages. Most notably, prior art voice-over-IP systems provide unacceptable quality of communications because of data loss in packets progressing via the Internet and because of delays associated with transmission via the Internet.

Moreover, voice-over-IP requires special equipment by at least one of the participants in the exchange and subscription to an ISP. As a result, prior art voice-over-IP is prohibitively expensive, inconvenient, and is not available in most locations due to the requirement for specialized equipment.

The present invention overcomes the disadvantages associated with the prior art and provides a new method and apparatus to achieve communications.

SUMMARY OF THE INVENTION

One aspect of the invention is directed to a method and apparatus for interfacing with a communication system to facilitate transmission of data from a first location to a second location.

The invention described herein overcomes the drawbacks in the prior art by providing a method and apparatus to facilitate the transmission of telecommunications over a packet-switched network, packet-based transmission system, or other medium separate from the voice telephone network. One advantage of the invention is reduced cost of telecommunications due to use of an Internet packet-switched network. Another advantage of the invention is monitoring of optimal routing paths prior to call set-up. Another advantage of the invention comprises monitoring of the communication session in real time for quality. Another advantage of the invention comprises re-routing of the communication session to an alternate path to maintain communication quality. Yet another advantage of the invention comprises use of least-cost-routing analysis to determine path selection within the computer network. In one configuration, least-cost-routing determines the path that results in the lowest charges being assigned to the call from completion over aspects of the public switch telephone network (PSTN).

In one configuration two or more Interfaces are located at various desired locations throughout the world. The Interfaces are enabled to communicate over a communication medium, in one embodiment the Internet. One or more Monitoring and Routing systems (M/R system) may optionally interact with the two or more Interfaces to serve as a central manager or network operations center.

The M/R system communicates with the Interfaces to evaluate the communication path characteristics between the various Interfaces. In one configuration the evaluation is based on feedback from the Interfaces regarding test packets or ping packets sent between the Interfaces to determine path characteristics and an analysis of any type of packet sent between Interfaces. The M/R system's evaluation determines the optimal routing between Interfaces.

In one configuration the Interface comprises a combination of hardware and software having systems that communicate and interact with a telephone network and having further systems to communicate and interact with a computer network, such as the Internet. In one configuration the M/R system comprises a combination of hardware and software configured to communicate and interact with a computer network.

In operation the Interface receives calls or other requests for services from another communication network, such as the PSTN. Upon receipt, the incoming call provides destination information and call data. The Interfaces, in conjunction with the M/R system, process the incoming call and utilize the destination information to determine a destination Interface. Optional variable compression may be performed on the call. The Interface converts the call data to packets having header information determined by the call destination. Thereafter, the Interface transmits the call in packet form on a computer network for receipt by a destination Interface.

At the destination Interface, the Interface receives the packets and re-constructs the call from packet form for communication back on the telecommunication network so the call may be delivered to the call destination.

One desirable feature of the invention comprises monitoring of the communication path on the computer network for path or route quality. If the monitoring reveals the route or path is not providing acceptable transmission characteristics the invention is able to re-route the call to another path on the computer network to improve communication quality.

In an additional embodiment the invention includes a command and control system (hereinafter C/C system) configured to integrate with and monitor or control one or more devices of a communication device, such as an Interface. The C/C system serves as a monitor and manager for the systems of the Interface. In one embodiment, the Interface includes a housing, environmental control system, and internal electronics. The housing comprises an outer shell to protect and lockably secure the internal components and to provide protection from contaminates. The environmental control system comprises one or more fans to regulate temperature inside the housing and one or more seals or filters to inhibit contaminants from entering the housing. In one embodiment, the C/C system comprises apparatus to transmit data to one or more remote locations, receive commands from one or more remote locations and monitor one or more systems.

One embodiment of the C/C system is now described. The C/C system includes one or more monitoring devices that monitor various aspects of the Interface. The monitoring device couples to a processor configured to analyze the data obtained from the monitors and take various actions depending on the results of the analysis. It is contemplated that software code may execute on the processor to facilitate desired operation.

In one configuration, the C/C system includes communication capability to notify a remote location of the results of the monitoring. In various embodiments, alarms or notification routines are established to provide notification upon the occurrence or non-occurrence of an event. For example, one or more temperature monitors provides data regarding the temperature within the housing to the C/C system processor. The processor analyzes this data and, if the housing temperature is not within a desired range, the communication bridge of the C/C system utilizes the communication capability of the Interface to report the temperature data to a remote location, such as to a M/R system.

It is also contemplated that the C/C system may take action in response to data received from a monitoring system. In another embodiment the M/R system communicates with the C/C system to initiate a response to data from a monitoring system. The C/C system is discussed below in greater detail.

Further objects, features, and advantages of the present invention over the prior art will become apparent from the detailed description of the drawings which follows, when considered with the attached figures.

DESCRIPTION OF THE DRAWINGS

FIG. 11A illustrates a block diagram of an example configuration of the back of an housing containing one or more Interfaces.

FIG. 11B illustrates a block diagram of an example configuration of the front of a housing containing one or more Interfaces.

DETAILED DESCRIPTION OF THE INVENTION

The invention is a method and apparatus for transmission of time and quality sensitive data. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention. Moreover, it is contemplated that the various elements of the present invention may be utilized alone or in any manner or combination.

Example Environment

Figure 1:
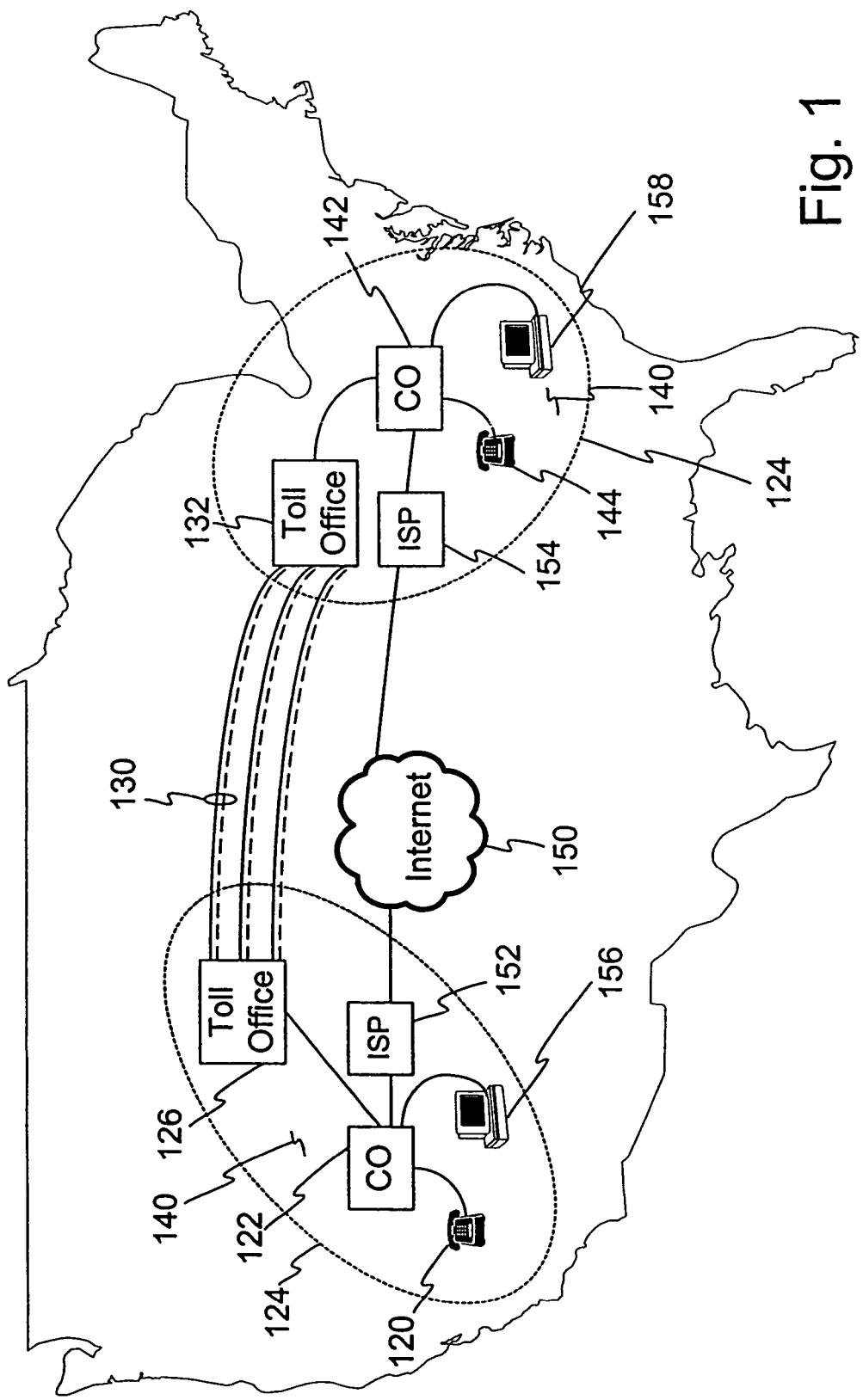
FIG. 1 illustrates an exemplary prior art configuration for achieving long distance communication.
Figure 2:
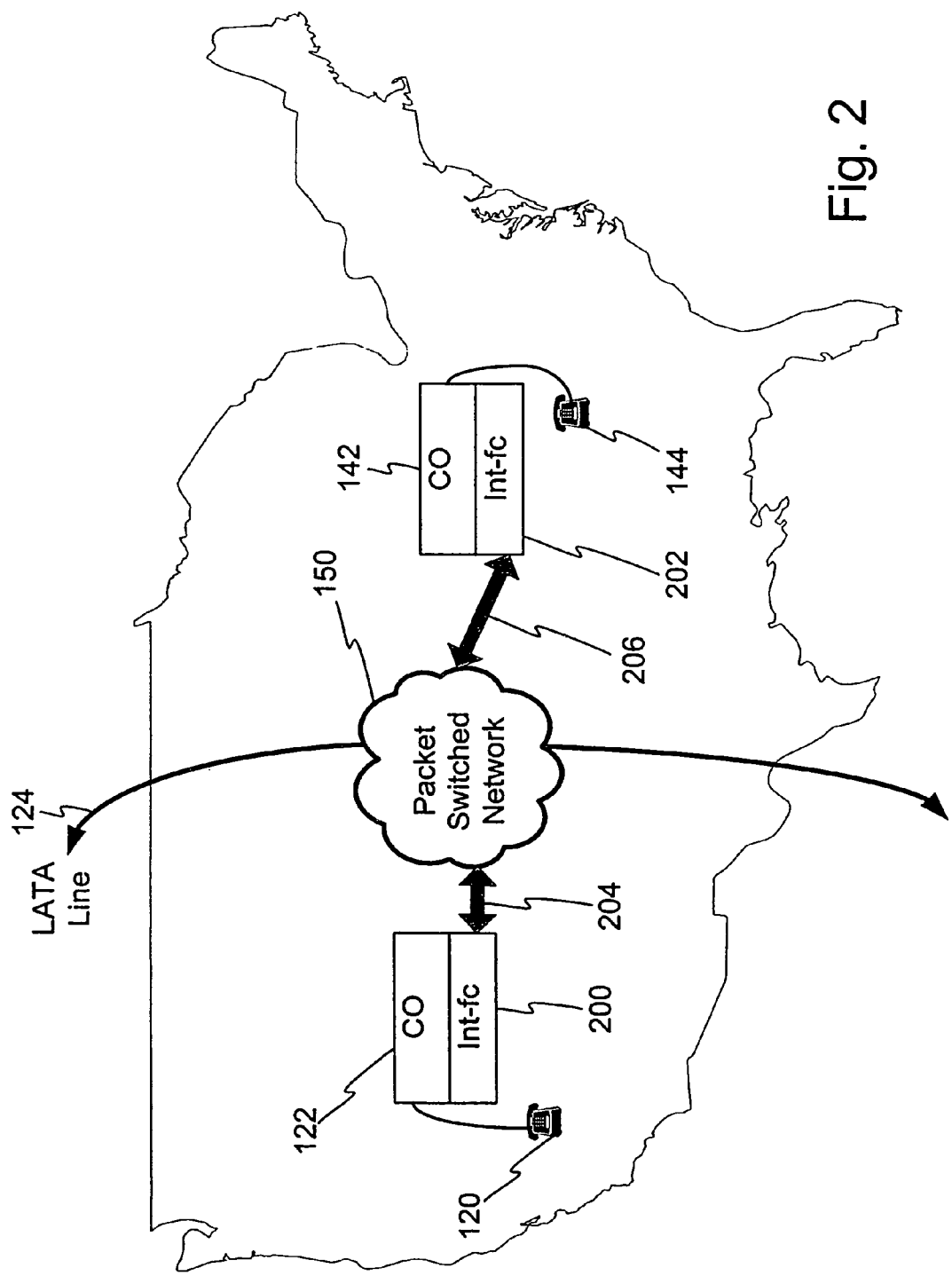
FIG. 2 illustrates a block diagram of an example integration of the present invention into communication systems.

For purposes of understanding, the present invention is first described in an example environment well suited for use of the present invention. FIG. 2 illustrates an example environment of a telephone network. In comparison to FIG. 1, like elements are labeled with like reference numerals. As shown, a communication device, such as telephones 120, 144 connects to a central office 122, 142 via a local loop or any other communication medium. Co-located within each central office 122, 142 is the Interface 200, 202 (Voice/Packet Interface) of the present invention. The equipment of the central office 122, 142 responsible for receiving and routing the incoming call is configured in communication with the Interface 200, 202. Generally similar configurations exist in central office 122 and central office 142. As the configuration of the central office 122, 142 is generally understood by those of ordinary skill in the art, a detailed description is not provided herein.

Each of the Interfaces 200, 202 are configured to facilitate communication between the systems of the central office and a computer network, such as by way of example the Internet 150. Connecting the Interfaces 200, 202 and the Internet 150 are high speed, high capacity communication media 204, 206. It is contemplated that the communication path between Interface 200 and Interface 202 may cross or intersect one or more LATA lines 124.

Example Embodiments

Figure 3:
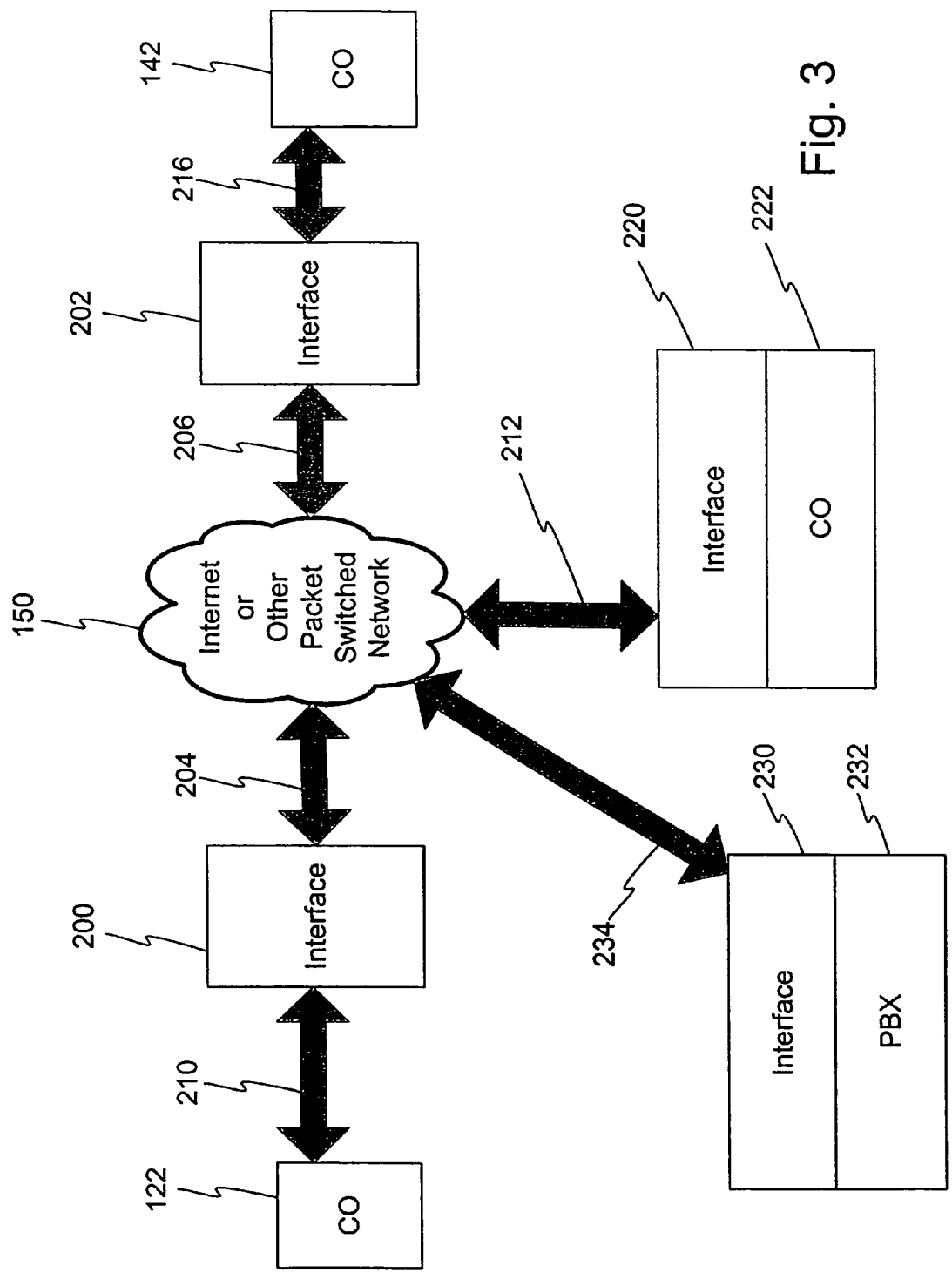
FIG. 3 illustrates a block diagram of an alternative configuration for integration of the present invention into a communication system.

FIG. 3 illustrates a block diagram of the present invention's linkage with existing systems of a telecommunication system wherein more than two Interfaces 200, 202, 220, 230 are enabled for operation. In comparison to FIG. 2, like elements are referenced with like reference numerals. As shown in this figure, the Interface 200 and Interface 202 are located remotely from central office 122, 142 and connected to each other by high speed and high capacity communication media 210, 204, 150, 206, 216. In one embodiment the communication capacity comprises T-1 capacity. In other embodiments the communication capacity or standard may comprise T-3, T-4, E-1, E-3, or OC-3 capacity. Various media can be utilized to carry this capacity including wireless, microwave, satellite link, and fiber optics.

Also shown in FIG. 3 is additional Interface 220 communicating with the Internet 150 via high speed and high capacity lines 212 and interfacing with a third central office 222.

Also shown in FIG. 3 is a fourth Interface 230 in communication with a private branch exchange (PBX) 232. The PBX 232 communicates with the Internet or other packet-switched network via an additional communication medium 234. The term PBX is used herein to mean any communication system providing communication capability to any number of individuals or devices. It is further contemplated that any number of Interfaces and central offices and PBXs may be combined in any number or any combination to facilitate communication in the manner described herein or equivalents thereto.

In operation, the first central office 122 is able to communicate with either the second central office 142 or the third central office 222, or the PBX 232 via the Internet 150 using the apparatus of the invention. Desirably, the Interfaces 200, 202, 220, 230 include means to communicate with a telephone network to thereby serve as a conduit to complete telephone calls or other communication requests at, for example, the first central office 122 to any of the other central offices 142, 222 or PBX having associated Interface.

Figure 4:
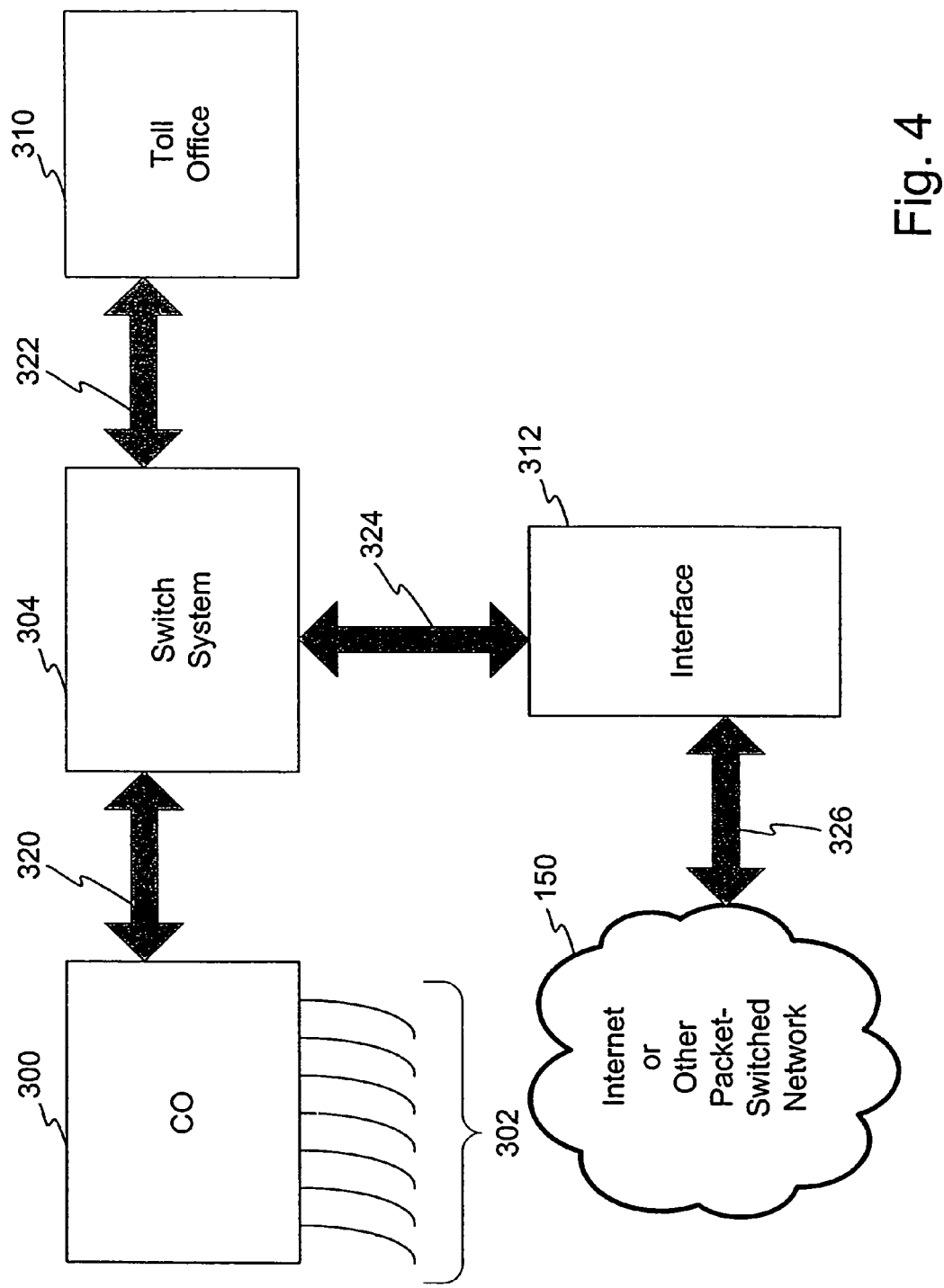
FIG. 4 illustrates a block diagram of an alternative configuration for integration of the present invention into a communication system.

In yet another embodiment the present invention communicates with a switching system 304 separate from the central office. FIG. 4 illustrates a block diagram of the Interface of the present invention with a switching system 304. As shown, a central office 300 includes a number of associated local loop lines 302 and a communication path 320 with a secondary switch system 304. The secondary switch system 304 may be publicly or privately owned and operated.

The communication path 320 between the CO 300 and the switch system 304 may comprise a single communication path or multiple communication paths. Incoming calls arriving at the switch system 304 from the central office 300 are referred to herein as the mother calls where calls exiting the switch system 304 to the central office after processing by the switch system are referred to herein as daughter calls.

Also in communication with the switch system 304 are one or more toll offices 310 and one or more Interfaces 312. Communication between the toll office or the Interface 312 occurs on high speed, high capacity communication media 324 such as a T-1 Line. The Interface 312 also communicates with a network such as the Internet 150 over a media 326.

In this discussion of example operation it is assumed that the switch system 304 is operated by a vendor of long distance services and/or long distance calling cards. As a result, a user of one or more of the lines 302 may dial a number to obtain long distance service via switch system 304. Mother calls via lines 302 are carried through the central office to communication path 320 to the switch system 304. The switch system 304 processes the call and may optionally process call data such as payment information or access authorization. Thereafter, the switch system 304 allows or disallows the call. Allowed calls are routed out as daughter calls to either a different central office 300 for local calls or a toll office 310 to gain access to long distance routing and transport services, being offered by larger long distance service carriers, to complete the call to a distant central office. Using the invention described herein, the call can be routed to the Interface 312 for completion. In one scenario the switch 304 operator/owner offers long distance calling service. Because they often buy long distance service in bulk, they may offer a desirable rate to consumers of their service. In systems of the prior art, switch system 304 was forced to utilize the service of a limited number of long distance carriers to complete the calls.

Utilizing the Interface 312 of the present invention the switch system 304 may connect directly to the Interface via a high speed, high capacity medium 324 such as a T-1 for transmission of calls in a packet form via a packet-switched network 150. It is contemplated that a similar configuration exists on the terminating side of the call at the remote location, at least to the extent of another Interface 312 to receive the data from the packet-switched network 150 (Internet) and thereby transfer the call to an appropriate telephone system for completion. This bypasses the need to obtain long distance service from a third party. In this manner the switch system 304 is provided an alternative method and apparatus to complete long distance calls. It is fully contemplated that in various other embodiments the present invention will be utilized to complete calls defined as local calls.

It is also contemplated that one or more Interfaces of the invention are co-located within Competitive Access Providers (CAP) to gain access to the communication channels of the CAP and to provide an alternative means of long distance call transmission from an originating office to a terminating office.

Figure 5:
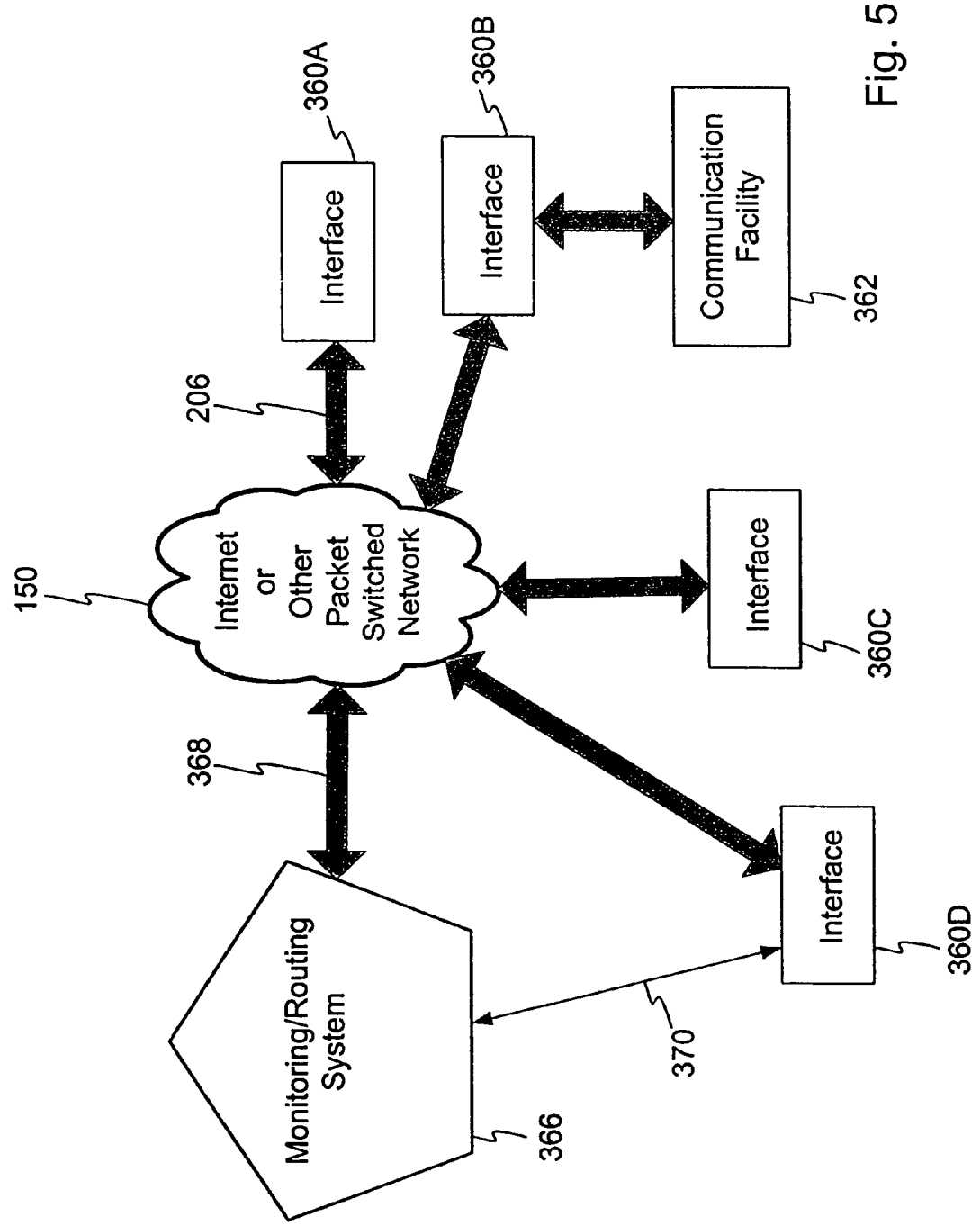
FIG. 5 illustrates an example embodiment of the present invention including two or more Interfaces with a Monitoring/Routing system.

FIG. 5 illustrates a block diagram of an example embodiment of Interfaces configured in communication with a monitoring and routing system. As shown, one or more Interfaces 360 communicate via the Internet 150 to facilitate packet transfer there between. It is also contemplated that one or more of the Interfaces 360 communicate with a communication facility 362. The communication facility could include, but is not limited to, a central office, a local exchange carrier, a competitive access provider, Internet service provider, or any site in which Internet access and PSTN access are provided.

Also shown in FIG. 5 is a monitoring and routing system (M/R system) 366. The M/R system 366 comprises a computerized control system configured to communicate with one or more of the Interfaces 360 via either of a connection 368 to the Internet 150, or via a direct connection 370. The connection 368 and direct connection 370 may comprise any method, apparatus, or medium configured to communicate information between remote electronic devices.

The M/R system 366 performs a plurality of tasks to oversee operation and facilitate communication among each of the one or more Interfaces 360. In particular, the M/R system of the present invention may be configured to control route selection between Interfaces 360, track billing, execute least-cost-routing algorithms, monitor channel path quality, and control re-route and transmission parameter decisions. Each of these is discussed in greater detail below. However, for purposes of understanding, a brief overview is immediately presented.

The M/R system 366 acts as controller for each of the Interfaces 360. To effectuate control, the M/R system 366 communicates with an Interface 360 using data packets transmitted via the Internet or other computer network 150 or directly via connection 370. For example, when an Interface 360A is presented with a call on an incoming channel it notifies the M/R system 366. The M/R system 366 establishes a billing record, and determines which of the other Interfaces is the closest destination, in the example, Interface 360D.

Figure 6:
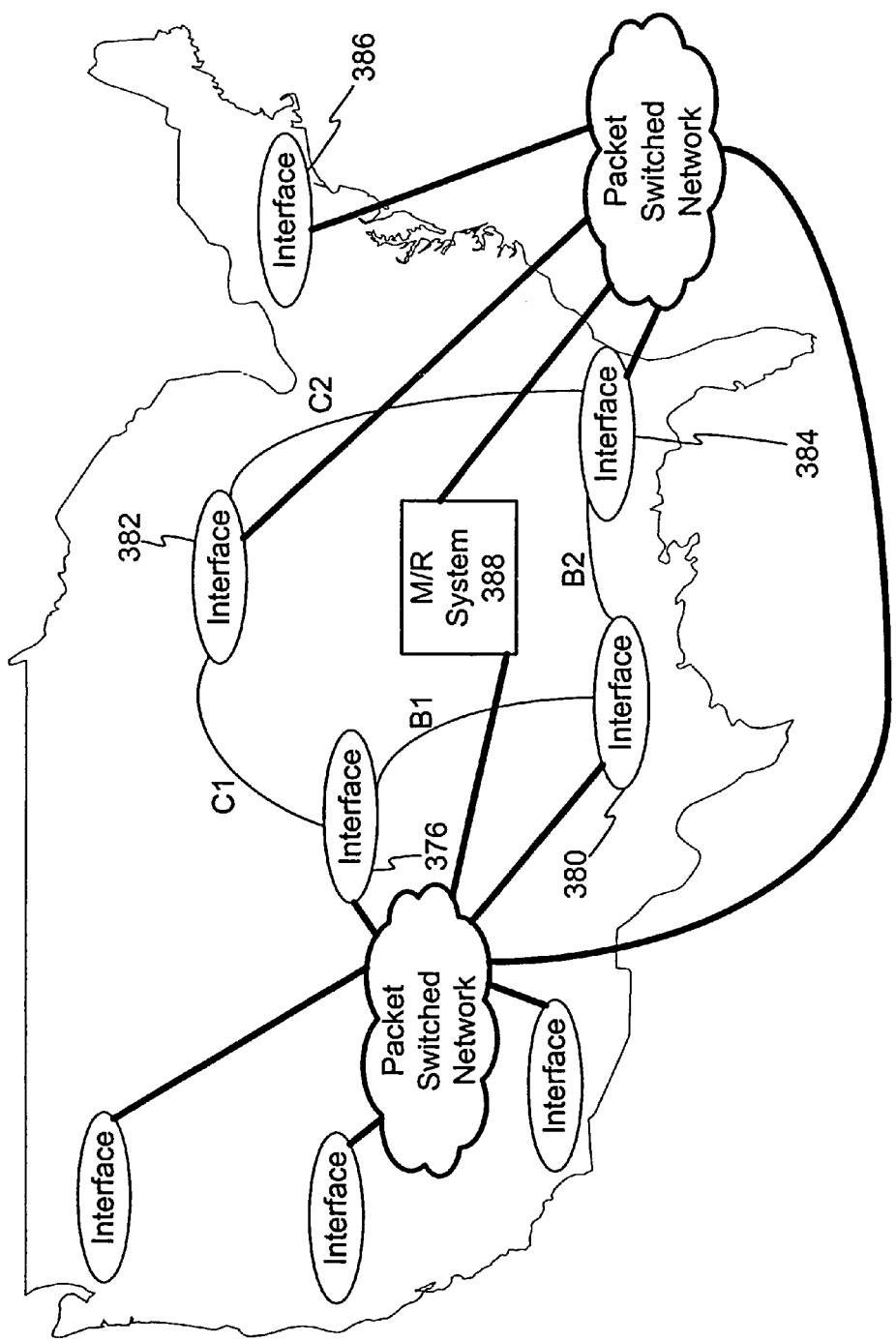
FIG. 6 illustrates an plurality of exemplary routing paths in a example configuration of two or more Interfaces and a Monitoring/Routing system.

The M/R also performs route selection based on testing done on the possible routes between the source Interface and the destination Interface. The M/R system achieves this testing by sending test packets between the various Interfaces. FIG. 6 illustrates a block diagram of a plurality of routes between two or more Interfaces. In one embodiment the testing comprises the sending of ping or other path characteristic packets. As shown, Interfaces 376, 380, 382, 384, 386 are in communication with each other and with an M/R system 388 via a packet switched network, such as the Internet. It is contemplated that this communication occurs over a packet-switched network, the Internet, or a direct connection.

To determine path characteristics, the M/R system initiates the sending of ping or other test packets from one Interface to another Interface. By way of example, if Interface 376 must route an incoming call to Interface 384, the M/R system utilizes the data obtained from the test packets to determine which route yields the most desirable path. One example path is through the packet switched network from Interface 376 to Interface 384. Another alternate path is from Interface 376 to Interface 384, represented as hops B1 and B2 through Interface 380, or through the packet switched network to achieve hops C1-C2 through Interface 382. Using the test packets, the M/R system determines the best path to route packets containing important data to complete the call. In one embodiment the communication medium between Interfaces and the M/R system comprises the Internet. It is contemplated that the M/R system continually monitors the characteristics of the various paths between each Interface. This allows the M/R system to analyze and select the most desirable path to route and/or re-route packets.

In further reference to FIG. 5, the M/R system 366 instructs the Interface 360A to address packets containing call information to Interface 360D. During the call the Interface 360A, 360D obtains data regarding the call and forwards this data to the M/R system 366. The M/R system 366 analyzes the call data for channel quality. If the quality of the channel, i.e. path over which the packets containing call data travel degrades to an unacceptable level, the M/R system 366 re-routes the call to a better path. In one method of operation, a different path is achieved by routing the packet through a different Interface one of the Interfaces 360B, 360C thereby causing the packets to take a different path.

Yet another desirable feature of the invention comprises least-cost-routing. It is contemplated that in some situations, there may not be an Interface close in location to the final call destination. Thus, to achieve call completion, the call is first routed to an Interface and then completed using standard PSTN operation. To achieve least-cost-routing, the M/R system analyzes the cost associated with completing the call via the PSTN from the destination Interface to the call destination when determining which Interface to designate as the destination Interface. Thus, the M/R system reduces the costs associated with utilizing the PSTN, wherein charges must be paid to another long distance carrier for call completion, to reduce the overall cost of the call.

Before discussing in greater detail the operation, features and advantages of the present invention, a discussion of the configuration and operation of a Interface 360 and an M/R system 366 is provided.

Figure 7:
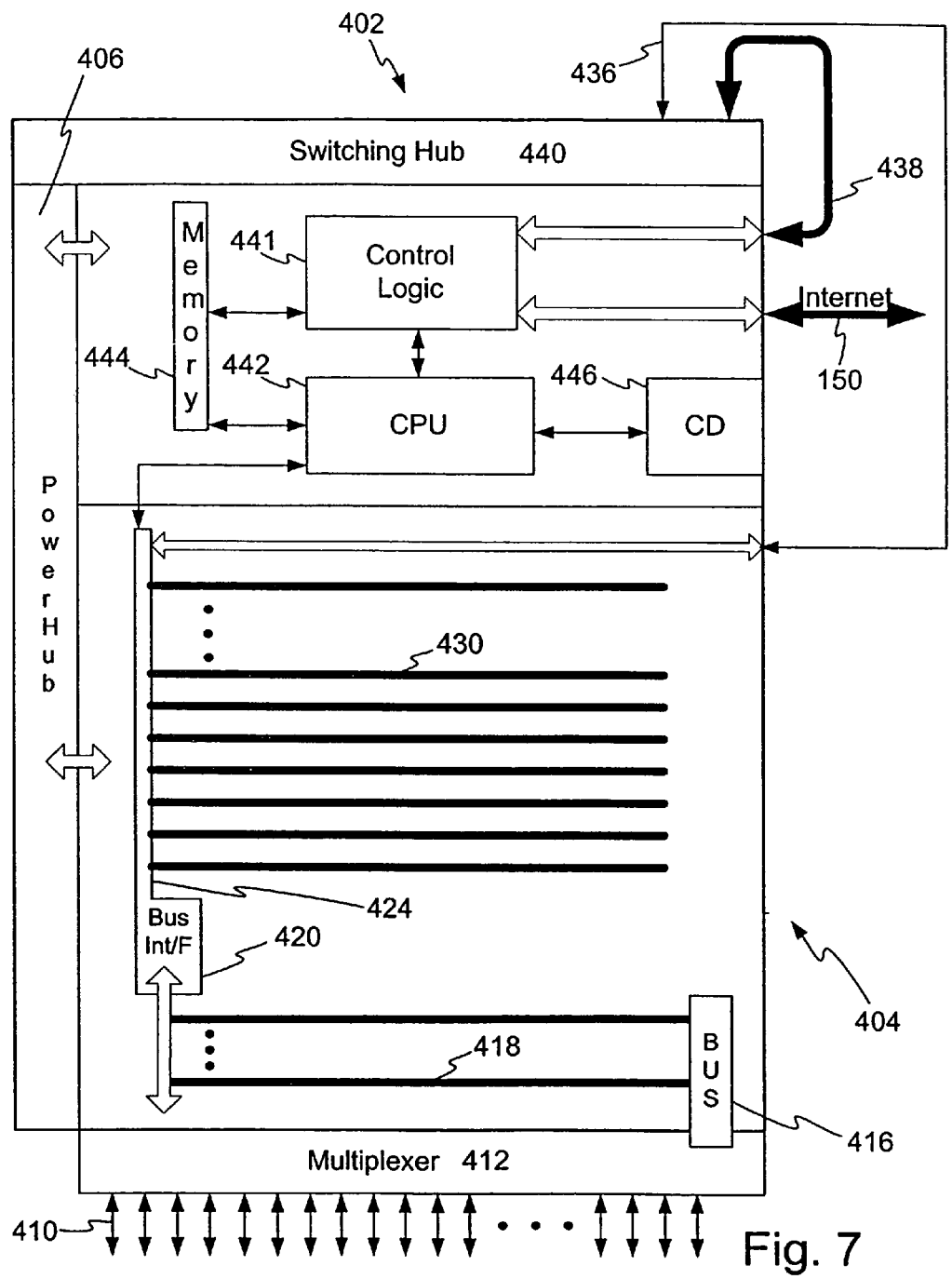
FIG. 7 illustrates an example embodiment of the voice network to packet network Interface as described herein.

In reference to FIG. 7, an illustration of a block diagram of an example embodiment of an Interface is shown. Broadly, the Interface comprises a switching system 402 (top portion of FIG. 7), telephony system 404 (bottom portion of FIG. 7) and associated power supply and control system (power system) 406. In general, the switching system 402 comprises software, logic and memory systems configured to communicate and interact with a computer network, such as the Internet, to receive, transmit and process data. In one embodiment the data is in the form of data packets configured in accordance with IP protocol. The switching systems also communicate with the M/R system, described below in greater detail.

In general, the telephony subsystem 404 comprises electronics configured to communicate with a telephone system, such as the systems of a central office, PBX, or stand-alone switch. The telephony subsystem 404 also communicates with the switching system 402 to facilitate conversion of analog data, such as voice, to data packets.

Both the switching system 402 and the telephony system 404 receive power from a power hub 406. Systems configured to supply power to one or more electronic systems are known by those of ordinary skill in the art and accordingly are not discussed herein.

For purposes of understanding, the apparatus of the Interface is now described in the order in which an incoming call from the PSTN encounters each device in the Interface 360. Turning to the bottom portion of the FIG. 7, one or more high capacity lines 410 connect to a multiplexer 412. The term multiplexer should be understood to mean either or both a multiplexer and/or a de-multiplexer.

It is contemplated that the lines 410 comprise any form of communication media for transferring incoming data to the systems of the present invention. In one embodiment, each line 410 comprises a T-1 line. As is commonly understood, T-1 lines have increased bandwidth capacity and hence increased data carrying capability thereby allowing the capacity of the present invention to be utilized. In one embodiment the Interface includes ports to connect to one or more T-3 cables and thus has about 672 lines per port for a maximum capacity equivalent to 1344 input/output lines. In an alternative embodiment, the Interface comprises means to connect to 1 to 56 T-1 lines. This equates to 24 ports per T-1 line for a total of 1344 total line capability. In yet another embodiment, the system comprises 1 to 40 E-1 lines, each having 30 ports for a total of 1200 ports.

The multiplexer 412 multiplexes these signals on the telephone lines in a manner known in the art and thereafter provides these signals on a multiplexer bus 416. Connecting to the multiplexer bus are one or more T-X processing cards 418. In one embodiment, each T-X card comprises a T-3 card having network communication and compatibility capability. In such an embodiment, a T-3 card, in North America and Japan, is equivalent to 28 T-1 channels, operating at a signaling rate of about 45 Mbps. Thus, in a channelized application each T-3 card supports 672 channels, each of 64 kbps. It is contemplated that in other embodiments, cards other than a T-3 card are utilized. The input to each of the one or more T-X cards may comprise a T-3 input that may connect to the back of the card. The card also communicates with the telephone network via multiplexer 412. In one embodiment the output of the T-X card comprises a digital signal. Access to the incoming signals is achieved via a bus interface 420 that also accesses the cards. In one embodiment the small computer system architecture standard oversees communication between the bus interface 420 and the one or more cards 418.

The output of the T-X device comprises a digital signal. It should be noted that the T-X card comprises any communication device capable of receiving and transmitting information at high speeds. In one embodiment the T-X card comprises a device capable of handling the capacity of a T-3 line.

The bus interface 420 connects to a second bus 424, which facilitates communication between one or more compression devices 430. In the configuration described herein the compression devices 430 are also responsible for constructing the data into packet form for transmission over a packet-switched network and de-constructing packets for transmission in another format, such as serial data, analog signals, or other non-packet format. In one embodiment the compression devices 430 comprise computer cards designed to process 60 calls per card and dynamically achieve up to a 12 times compression ratio. In other embodiments, cards having greater capacity may be utilized. One compression device capable of achieving such rates of compression is available from Audio Codes located in Yehud, Israel, with offices in San Jose, Calif. It should be noted that in one embodiment the compression may be dynamically adjusted by the Interface, the M/R system, or other apparatus.

The telephony system 404 transfers the packet output of the compression devices 430 via communication line 436 to the switching hub 440. The switching hub operates in a manner known by those of ordinary skill in the art thereby providing output to connector 438. In the configuration described herein the hub 440 combines multiple IP streams on to the computer network. In one embodiment connectors 436, 438 comprise Base100T Ethernet cable connectors.

In one example embodiment, the switching system 402 comprises various control logic 441 in communication with the connector 438, one or more CPU devices 442, one or more memory units 444, and one or more storage media interface devices 446. In one configuration, these apparatus obtain power from the power hub 406. It is contemplated that the memory unit 444 can comprise RAM, ROM, hard disk drive, flash memory, disk drives, compact-disc optical media, or any other media suitable for the storage of data. The media interface 446 can comprise any device capable of input and output from data to the Interface, such as a CD-ROM drive. In other embodiments the media interface 446 can comprise a floppy disk drive, hard disk, a port such as a parallel port, serial port, USB port or Ethernet port. The CPU 442 can comprise any processor or controller configured to execute software and other data processing operations. In one embodiment the CPU 442 comprises a Celeron brand processor as is commonly available from Intel Corp. of Oregon.

The control logic 441 communicates with an input/output port connected to the Internet or some other computer network communication medium to thereby achieve data packet transfer into and out of the Interface. In one embodiment the Interface includes means to connect using a 10/100 Ethernet communication standard to achieve input/output to the computer network. In one embodiment the Interface includes means to connect one or more T-1 capacity lines or E-1 capacity lines to provide communication speeds at about 1.544 MBPS and 2.048 MBPS respectively.

The CPU 442 and memory 444 work in unison to facilitate packet transfer into and out of the computer switch system 402. In one embodiment the media interface 446 contains a compact disc having software stored thereon that facilitates operation of the Interface in the manner described herein. In alternative embodiments the compact disk may be left in the drive 446 during operation or the compact disk may be removed from the drive and the entire software stored in the memory 444. In the latter configuration the software is secure since the compact disk is not subject to theft.

Communication between the Interface and M/R system occurs in connection with the operation of the switch system 402 of the Interface. Details regarding the interaction between the Interface and the M/R system are provided below.

Operation of the Interface occurs in the following manner. It is contemplated that the Interface be connected to one or more high speed data lines 410 that provide signals containing call information, including voice information and routing information to the Interface from some form of communication network connection, such as a connection to a central office, PBX, or switch. In other embodiments the Interface may process information other than voice information. It is further contemplated that the lines 410 comprise T-1 lines or T-3 lines capable of carrying multiplexed data. The multiplexer 412 multiplexes the incoming signals in a manner known in the art and provides the multiplexed signal to the multiplexer bus 420. The multiplexer bus 416 communicates the incoming signals to the one or more T-X communication cards 418.

The incoming data on lines 410 includes data regarding the desired destination of the incoming signals. In one configuration this information comprises a 7 digit or 10 digit numeric value representing a destination telephone number that accompanies call data. In another embodiment, the information comprises a 14 or 16 digit numeric value as might be used in a country other than the United States. The destination number is utilized to preferably route the call to a destination Interface near the location of the destination number.

After processing by the T-X cards 418 the T-X card communicates the signal, via bus 424, to a compression device 430. In this example embodiment the compression device performs variable compression on the signal. In this embodiment the compression ratio is controlled by the CPU based on instructions from the M/R system and can vary dynamically.

After compression the compression device 430 outputs the signal on path 436 to the switching hub 440 wherein it is routed to control logic 441 via line 438. The control logic 441 monitors the packets and appends appropriate routing data to the header of the packet. The M/R system in conjunction with the switch system 402 and telephony system 404 creates the routing data based on the least-cost-routing algorithms, channel quality monitoring and the destination of the call data.

The components of the switch system 402 transmit the packets on one or more cables via the Internet or other packet-switched network to another Interface configured to service the call destination. In other embodiments the Internet is avoided and data is sent via one or more dedicated or shared trunks or cables.

Monitoring and Routing System (M/R System)

The M/R system can comprise any system capable of communicating with a computer network and executing algorithms embodied in software code. In one example embodiment, the M/R system comprises a network operations center computer system running the software to perform the tasks of the M/R system. The network operations center is a control hub for the entire network. In another embodiment the control center may be distributed to a plurality of centers or computers.

As described generally above, the M/R system acts as a central system to service the plurality of Interfaces and perform path analysis based on test packets sent between Interfaces. The M/R system also determines if and when to re-route a call, performs dynamic billing and accounting functions, effectuates least-cost-routing and dynamically compresses the data to increase capacity and compensate for changing circuit conditions. The operations of the M/R system execute in part on the Interfaces, and in at least one possible configuration, the M/R system is a distributed operation. It is contemplated that in other embodiments the M/R system can be eliminated and its tasks assigned to the Interfaces.

Operation of Interface and/or M/R System

Having discussed one possible implementation example for the invention, the following discussion focuses on one possible example method of operation of the Interface systems and the M/R system of the present invention. For purposes of understanding, the operation of the invention is described in conjunction with a telephone network. In such a configuration, the operation achieves a coupling between the telephone network and a computer network, such as the Internet, to facilitate the transfer of voice or data communication over the computer network and back to the telephone network at a remote location. In the embodiment described herein the transmission over the computer network is in packet form to more fully utilize available bandwidth and provide means to dynamically route and re-route calls. This is an advantage over a dedicated circuit scenario.

While the systems described herein will prove particularly useful for transmission of voice or video data from a first location to a second location, it is contemplated that types of data other than voice or video data may be transmitted. These types of data include any that are time sensitive. In addition, the system of the present invention advantageously provides a method and apparatus to transmit data over a computer network in packet form without suffering from the disadvantages of time delay. Delay in voice transmission is unacceptable. To overcome this disadvantage, the system described herein utilizes a Monitoring and Routing system (M/R system) to dynamically and in real time monitor the characteristics of the data transmission between two or more Interfaces. If the monitoring reveals that the signal received by a user is of low quality, the M/R system will direct the Inteface to re-route the transmission or alter another dimension of the transmission to improve quality.

Figure 8A:
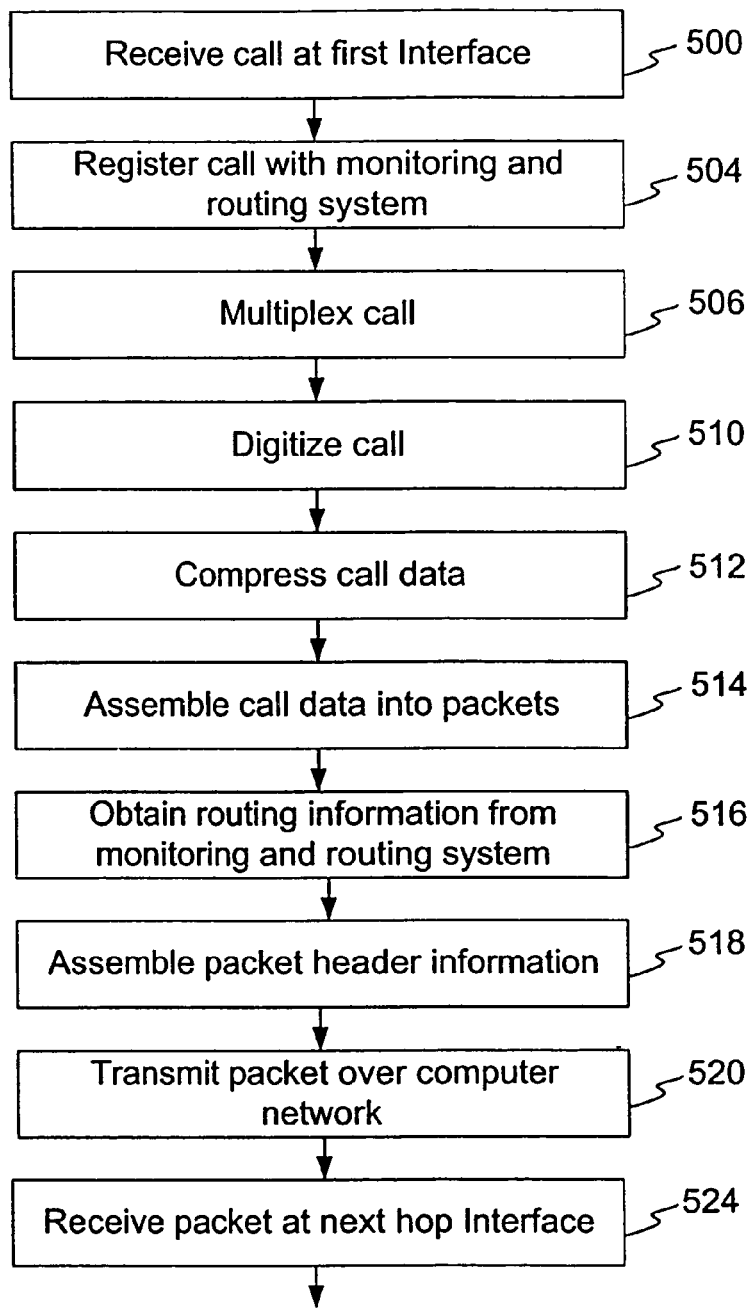
FIG. 8A-8B illustrates an operational flow diagram of an example method of operation of the present invention.

FIG. 8A illustrates one possible method of operation. As shown, at a step 500 the Interface receives a call. For purposes of understanding, an individual may utilize a telephone to place a call to a remote location. The call travels to a central office and is eventually routed to a Interface for routing over a computer network. At a step 504 the operation registers the incoming call with the M/R system and obtains the destination data. The M/R system is now able to track the call and monitor its progress for purposes including billing and quality monitoring. It is contemplated that in some versions of the M/R system upon receiving notification of the call and the call destination, the M/R system initiates a process of determining a preferred routing path. In one configuration, the M/R system utilizes least-cost-routing depending on existing patterns and rates.

Next, at a step 506 the multiplexing hardware of the Interface may de-multiplexes the call. This step is necessary if the call is received over a high capacity line in multiplexed format. Thereafter, the operation may optionally digitize the call, if necessary, step 510, and compress the digital call data, step 512. In one embodiment the compression is variable and may be adjusted to account for transmission characteristics and network behavior. In one embodiment, the compression ratio is up to 12 times.

Thereafter, at a step 514, the operation converts the call data into packets of call data. Next, at a step 516, the Interface obtains data from the M/R system regarding the preferred routing information. This may include the final point of presence and the destination trunk. At a step 518 the header information is assembled into a packet header and associated with the appropriate call data packet. This occurs in a manner known in the art and is accordingly not discussed in great detail herein.

After assembly the system transmits the packet over the computer network based on the routing of the header information. This occurs at a step 520.

After traveling through the computer network the packet arrives at the Interface at a step 524. It is contemplated that the packet may travel through one or more routers or other processing devices as it progresses through the computer network.

Figure 8B:
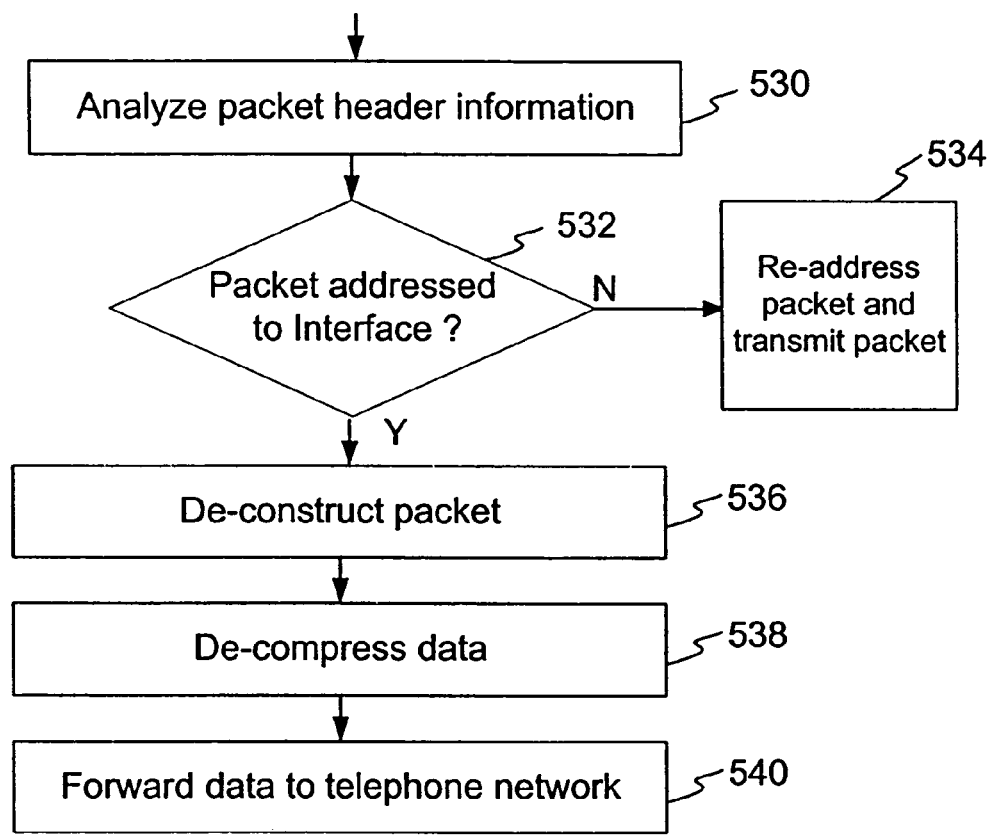

After receipt at the next hop Interface, step 530, FIG. 8B, analyzes the packet header information. At decision step 532 the next hop Interface determines if the packet is addressed to the Interface. If it is not addressed to the Interface, the packet is re-addressed to the next hop and the packet re-transmitted. This is shown at a step 534. Alternatively, if the packet is at its destination, the operation progresses to step 536 and the hardware and software of the Interface de-constructs the packet to extract the desired data. Thereafter, at a step 538, the data are de-compressed and at a step 540 the data are forwarded to the telephone network via the proper port on the Interface. The final Interface is referred to herein as the destination Interface.

Although the process describes a method of operation in terms of single data packets, it is understood that the process covers transmission of numerous packets in a generally similar manner. Likewise, although the process is described in terms of transmission from a first Interface to a second or destination Interface, it is understood that communications occur in both directions among the any of two or more Interfaces utilizing a similar process. It is contemplated that the packets representing each half of a full duplex conversation may travel on different paths through the Internet.

The present invention may also include desirable aspects to maximize the quality of call or transmission prior to call set-up and during the call. One example comprises monitoring various communication paths or routing schemes prior to the time the call is received at the Interface so that the M/R system can assign an ideal path to the incoming call.

Figure 9:
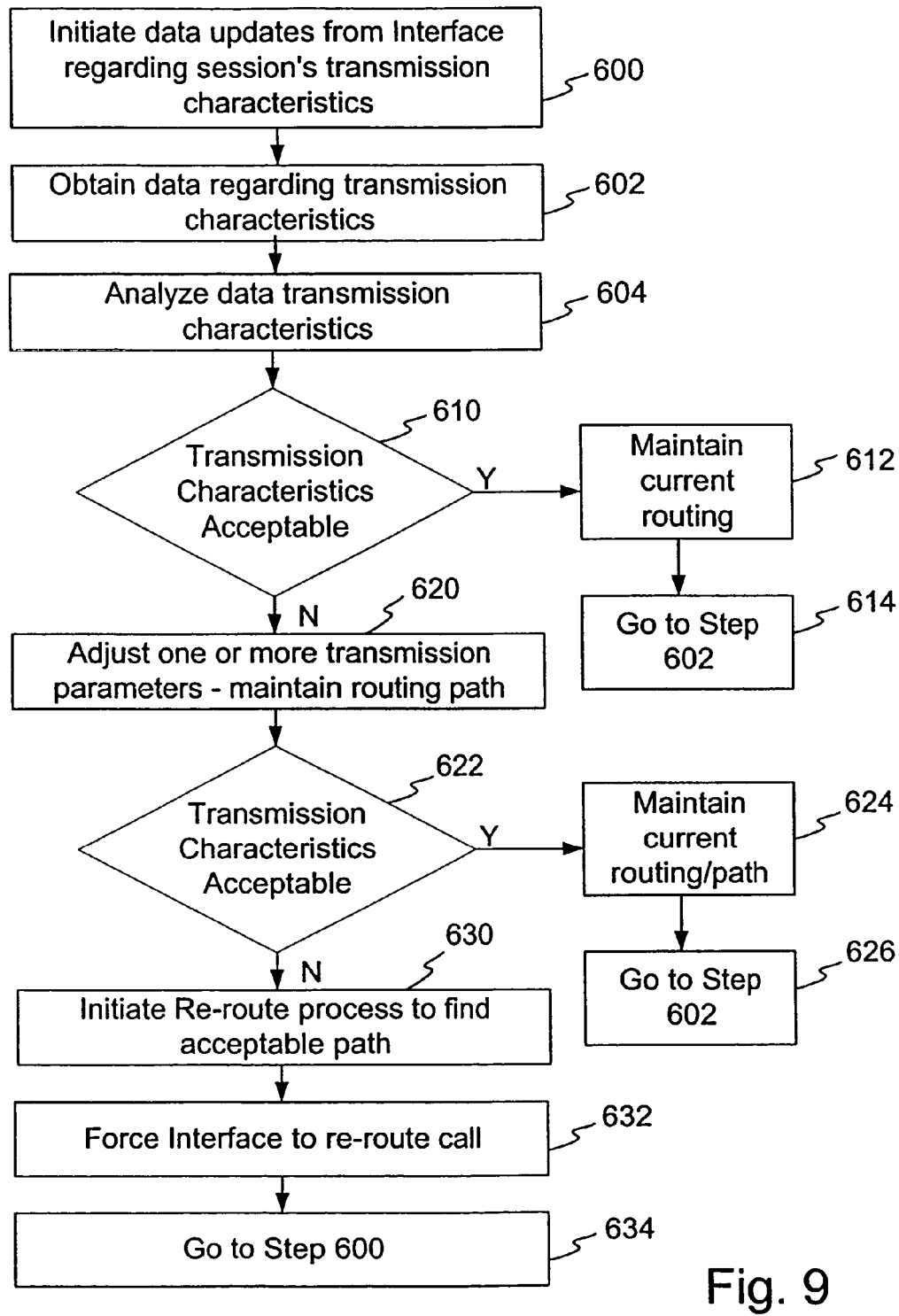
FIG. 9 illustrates an operational flow diagram of an example method of call monitoring and re-routing.

Another desirable feature of the present invention comprises monitoring of transmission characteristics during the communication session, that is, during the call, as the communication session progresses. It is contemplated that the packets may be routed to more than one Interface before the packet reaches the destination Interface. FIG. 9 illustrates an operational flow diagram of an exemplary method of monitoring a communication session. During a communication session, at step 600, the M/R system initiates an update process or receives data from each Interface participating in the communication session regarding the session's transmission characteristics and/or the behavior and operation of the path over which packets are presently being sent. This can be achieved in several ways or in any combination of ways. One possible method comprises sending ping packets between Interfaces to reveal path characteristics. Another method comprises monitoring and analyzing any type of packet sent between Interfaces.

The transmission characteristics of the path define one or more aspects of the routing path and how the path affects the packet. The effect on the packet may comprise jitter, bit error (represented as bit error rate), latency, or packet loss. Once this process is initiated, the M/R system receives the data at a step 602. In one embodiment this information is received over the same or similar computer network over which the communication session packets are being transmitted. In another embodiment the characteristic data are received via a dedicated channel.

Next, at a step 604 the M/R system analyzes the received data to determine the characteristics of the communication session. In one particular embodiment, the characteristics comprise the quality or acceptability of the communication between a sending Interface and a receiving Interface. For example, it is desirable for voice communication to be of a certain quality level to understand or enjoy the conversation. Problems with voice communication can comprise lost speech, jitter, delay, echo, or dropped calls.

After analysis of the data obtained from the Interfaces, the operation progresses to decision step 610 wherein the M/R determines if the transmission characteristics of the communication session are acceptable. Various factors determine if the characteristics are acceptable as can be envisioned by those of ordinary skill in the art. Various quality standards may be applied based on user determinable factors and system utilization.

If the characteristics are deemed to be acceptable, at step 612 the operation maintains the current routing of the communication session and thereafter progresses to a step 614 where the operation returns to the step 602. The operation continues in this manner to continually and in real time monitor the communication session and path. In other embodiments the update process can occur at any various interval.

If at step 610 the operation determines that the transmission characteristics are below a desired quality level the operation executes step 620 to adjust one or more parameters of the communication session. In one execution the compression rate is adjusted to increase call quality. In another execution a process or interpolation is utilized to further improve speech quality. It is contemplated that the adjustments made during step 620 do not include re-routing of the call.

After adjustment to the transmission parameters, the operation progresses to a decision step 622. At decision step 622, the operation again determines if the transmission characteristics, as determined by the updates received from the Interfaces handing the particular call or communication session are within acceptable limits. If the adjustments have improved the transmission characteristics the operation goes to steps 624 and 626. These steps are generally identical to steps 612 and 614 discussed above.

Alternatively, if at decision step 622 the transmission characteristics are not acceptable, the operation, at a step 630, initiates a re-routing of the communication session to a different path. In another example a different path is selected by the M/R system based on the monitoring of alternate paths by the M/R system and Interfaces to find acceptable alternate routing paths.

Next, after determining an alternate and acceptable re-routing, the M/R system forces the Interface to re-route the call on the new path at step 632. As is understood, packets are routed in various paths and manner by altering the content of the packet header. In one embodiment the packets are bounced to another Interface. After the M/R system and Interface re-route the call the operation returns to a step 600 at step 634.

Figure 10:
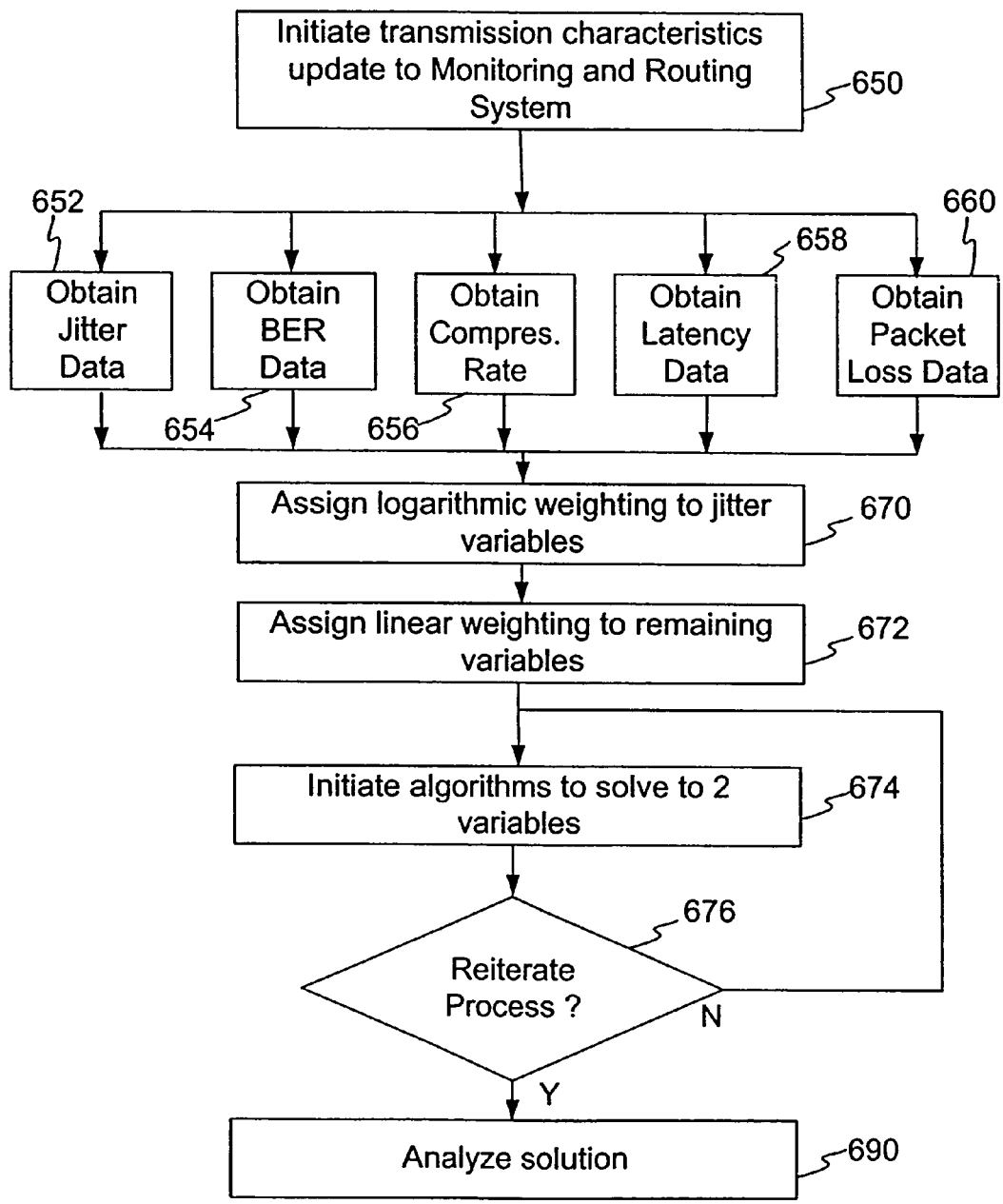
FIG. 10 illustrates an operational flow diagram of an example method of call quality analysis.

FIG. 10 illustrates a more detailed operation flow diagram of the process of analyzing the data transmission characteristics as shown in step 604 of FIG. 9. It is contemplated that in one embodiment one or more software modules are utilized to perform this analysis. In operation, an update of the transmission characteristic data is sent to one or more modules (hardware and/or software) for analysis by the M/R system at step 650. In one embodiment, these data are obtained in packet form over a computer network. Next, at steps 652-660, the operation obtains the data that define the transmission characteristics. In this embodiment, this information comprises jitter 652, bit error rate (BER) 654, compression rate 656, latency 658 and packet loss 660. In one example method of analysis, at a step 670, the system assigns logarithmic weighting to the data representing jitter. Next, at a step 672, the analysis module assigns linear weighting to the remaining variables. It is contemplated that the systems described herein are not limited to one particular method or particular manner of analysis, such as logarithmic or linear weighting, of the data received. For example, in an alternative embodiment, analysis comprising direct time scale comparison is utilized. One implementation of direct time scale comparison comprises comparison of the time required for a packet, such as a ping, to complete a first route as compared to a second route.

Next, at a step 674, the operation initiates algorithms to solve the equations to determine routing parameters. In one configuration, this comprises initiating algorithms to solve the above-mentioned data values to obtain a desired Interface to designate as the destination. At a step 676 a decision is made whether the analysis has been complete. If the process is not complete, the process is reiterated by returning to a step 674. If at decision step 676 the algorithms have determined the desired solution, the operation progresses to a step 690 wherein the M/R system analyzes the results to determine if the routing is acceptable. If the routing is not acceptable, the call can be re-routed along a different path in the computer network. It is contemplated that the call can be re-routed numerous times during the communication session. Other methods of operation are contemplated.

Command and Control System

Another aspect of the invention is a command and control module configured to monitor one or more aspects of an electronic device, such as the Interface, and control one or more apparatuses in response to the monitoring and/or report the results of the monitoring to a remote location.

Before discussing the command and control system in more detail, additional details regarding an exemplary device, are provided. FIG. 11A illustrates a plan view of an example embodiment of the back of a housing containing one or more Interfaces. FIG. 11B illustrates a plan view of an example embodiment of the front of a housing containing one or more Interfaces. Various embodiments are described in conjunction with an Interface. It is fully contemplated that the command and control system (C/C system) can be utilized with any electronic or optical device. In reference to FIG. 11A, the back of a Interface housing includes an outer shell or casing 700 that generally surrounds a back panel 702. The back panel 702 may include one or more openings or apertures as desired to gain access to apparatuses mounted to the back panel or on the interior of the housing 700. The housing 700 and back panel 702 may be constructed from metal, plastic composite, or any other material able to protect the interior of the housing 700 and allow for conveniently mounting of hardware thereto.

Attached to the back panel 702 and generally aligned with the one or more apertures are one or more fans 704A-704J or other ventilating devices. The fans 704A-704J are located to provide desired cooling to the interior and electronic apparatus of the housing 700. The fans 704 may include filters. In one configuration the fans 704 comprise a brushless, ball bearing type fan available from Sunon Corp located in Hong Kong.

Fans 704I and 704J ventilate a first power supply 706 and a second power supply 708 respectively.

Also shown exposed through the back panel 702 are one or more connectors 710 configured to couple an Interface with a packet switched network and/or a telecommunications network.

The housing 700 also includes one or more openings designed to provided access to the internal apparatus of the Interface. These one or more openings are monitored by one or more intrusion sensors 712 capable of detecting and reporting data regarding an intrusion into the interior of the housing 700. One example of the intrusion data comprises an alarm or voltage signal. The openings into the housing 700 may include seals to inhibit contaminates such as dust or any other unwanted matter from entering the housing.

In reference to FIG. 11B, a front of an exemplary housing 700 is shown. The front includes an outer shell 700 that surrounds a front panel 720. The front panel 720 may contain one or more openings configured to provide ventilation, one or more larger openings to access apparatus or electronics, or additional openings for data input/output connectors.

In one configuration one or more fans 722A-722F may mount to the front panel 720 and utilize one or more openings on the front panel to provide ventilation to electronic devices of the housing 700. The front panel may also include one or more intrusion sensors 712 configured to provide a signal in the event of an unauthorized entry into the housing 700.

A first bay 730 and a second bay 732 are also shown on FIG. 11B. In the example embodiment shown, the first bay 730 includes a first media drive 734 and the second bay 732 includes a second media drive 736. In one configuration the first media drive 734 and the second media drive 736 comprise compact disc drives. In other embodiments other types of drives may be used including but not limited to DVD, magnetic disk drives, and/ or other random access storage media. The first bay 730 and second bay 732 be thought of as first and second Interface.

Figure 12A:
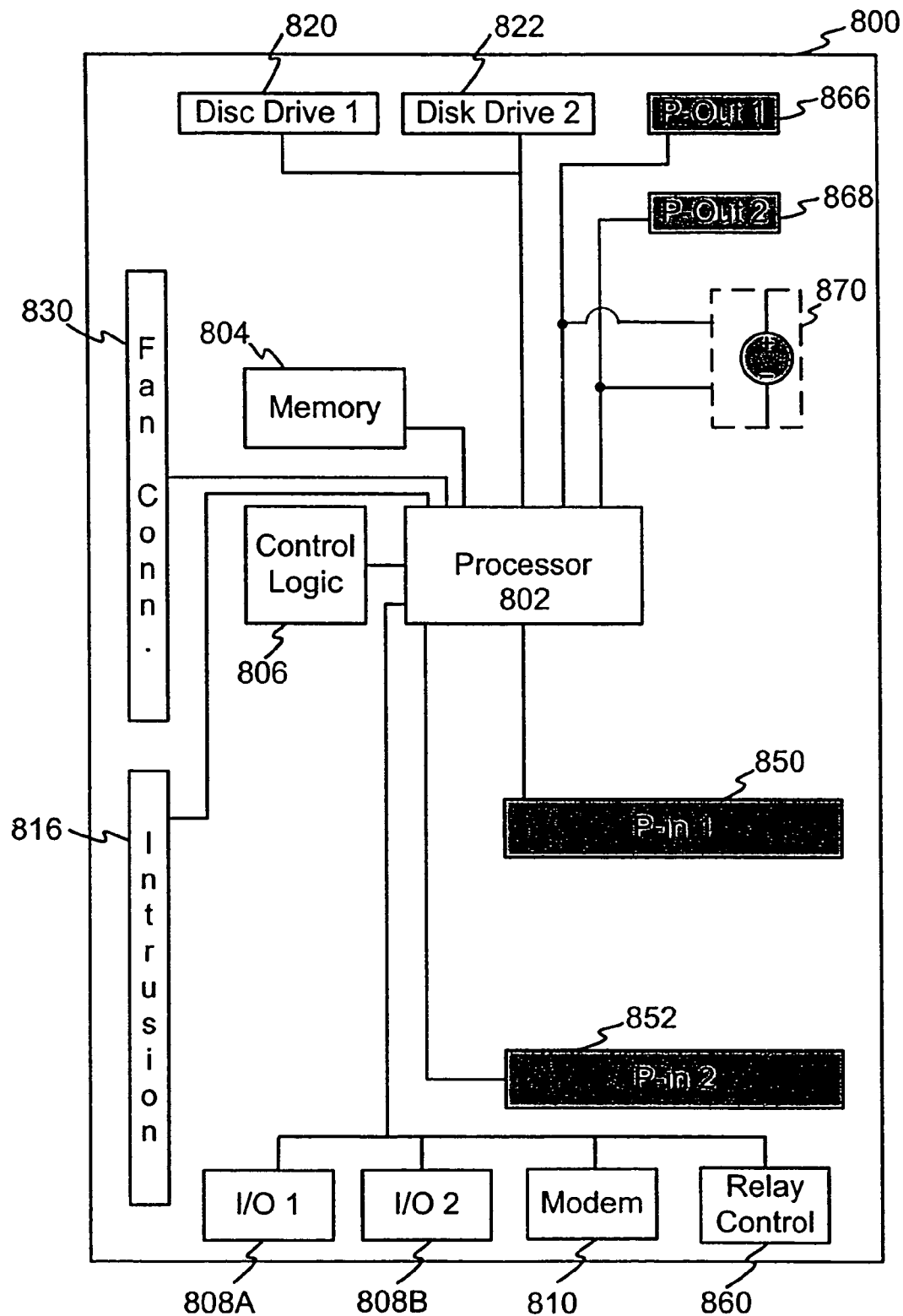
FIG. 12A illustrates a block diagram of an example configuration of a command and control system.

FIG. 12A illustrates a block diagram of an exemplary embodiment of the C/C system. The embodiment shown in FIG. 12A is constructed with a plurality of integrated circuits, memory, various logic, connectors or couplings and conductor traces on a circuit card or board. One or more couplings are provided on the C/C system to facilitate communication with or receive data from monitoring devices, an Interface as described above, or other apparatus. It is contemplated that the hardware shown on FIG. 12A may operate in conjunction with various software code. Other configurations of hardware and software other than those shown are contemplated.

In reference to FIG. 12A the C/C system board 800 includes a processor 802. The processor 802 may comprise any general purpose processor or other central processing unit capable of collecting or receiving data, analyzing data, and executing various responses based on the analysis of the collected or received data. In one embodiment the processor 802 comprises a programmable processor such as an Altera MAX brand processor available from Altera Corp. located in San Jose, Calif. The processor oversees operation of the C/C system including analysis of the data collected by the one or more monitors or sensors of the C/C system.

In embodiment shown, the processor 802 communicates with the one or more Interfaces in the housing via Interface connectors 808A, 808B. The Interface connectors 808A, 808B may comprise any type of coupling or bus capable of achieving data transfer. Hence, the processor 802 may communicate data to and receive data from the communication aspects of the one or more Interfaces contained within the housing. As described above, an Interface may communicate with the M/R system. Hence, the Interface connectors 808A and 808B provide means to for the C/C system to communication with the M/R system. Conversely, the M/R system can control the C/C system via an Interface. Other modes of communication with the C/C system are also available using the connection to the packet switched network achieved by the Interface, or other communication medium. Thus, the C/C system advantageously provides monitoring capability and communication and control capability of the Interface or other device from a remote location over a computer or other communication network.

A modem connector 810 resides on the board 800 and is in communication with the processor. The modem connector 810 facilitates communication between a modem and the processor 810. The modem may comprise any communication device that operates independent of the one or more Interfaces accessed via connectors 808A and 808B. In one embodiment the modem comprises a communication device operating under the V.90 communication standard. Advantageously, the modem provides an alternative means of communication between the C/C system and a remote location, such as the M/R system. In the event communication with the C/C system can not occur via a Interface, the modem connector 810 and processor 802 provide an alternative and backup communication system.

Numerous conductive traces connect the processor to other devices and connectors. In one embodiment, memory 804 and various control logic 806 connect to the processor 802. The memory 804 may comprise any type of memory capable of storing data or software code, including but not limited to, RAM, SDRAM, DRAM, RDRAM, flash memory, a hard disk drive, and compact disc drive. The control logic 806 may comprise various static and dynamic logic configured to facilitate operation of the C/C system as described in greater detail below. The control logic 806 may also comprise solid state switches and other associated devices as necessary to achieve the functions described herein.

The C/C system board 800 includes an intrusion coupling 816 that facilitates connection to one or more intrusion sensors (element 712 on FIGS. 11A and 11B) located throughout the Interface. The Intrusion sensors may comprise any sensor capable of providing data or a signal indicating an opening or breech of the housing 700 of the Interface, or an indication that the housing 700 has been moved or of any other undesired interference with the system. In one embodiment the intrusion sensor comprises a micro-switch available from Honeywell located in Freeport, Ill. The processor 802 monitors the data from the intrusion sensors to detect unauthorized intrusion into the housing 700. The intrusion sensors or the processor's monitoring for an intrusion signal may be disabled to allow for maintenance or service of the Interface.

The C/C system can take various actions in response to an intrusion alert including but not limited to, sending notification to the M/R system, sounding an audio alarm, corrupting data or software, disabling hardware operation, or initiating tracking devices to identify the housing 700 and ascertain its location so that it may be retrieved. Operation of the processor 802 and reaction to an intrusion alert are discussed below.

As discussed above, the Interface includes various drives to store data or receive data, such as a compact disc drive, DVD drive, or other storage media. The C/C system board 800 includes a first disc drive coupling 820 and a second disc drive coupling 822. The disc drive coupling 820, 822 may connect to any type of drive, media reader, or memory capable of storing or receiving data and/or software code. The first and second disc drive couplings 820, 822 provide power to a first and second disc drive. The drive couplings 820, 822 also facilitate monitoring of one or more aspects of the drives in that processor 802 obtains data regarding operation of the drives via the drive couplings 820, 822. In one embodiment the processor 802 monitors the current drawn by the one or more drives. Through monitoring of these or other parameters of drive operation the processor 802 can obtain data to evaluate the drive to determine if a drive is failing or operating in an undesired manner.

The processor 802 may be configured to or execute software code to evaluate the monitored data from the drives. For example, the processor 802 may compare the data from the drives to data stored in memory 804 regarding desire ranges into which the monitored data should fall. In the case of current, if the drive is drawing too much current it may be an indication of failure. As a result, the processor can alert the M/R system using the communication capability of an Interface, accessed through the connectors 808A, 808B of the operation of the drive. The M/R system may then take any action desired including dispatch of a repair technician to the Interface.

A fan connector 830 is also located on the C/C system board 800. In at least one embodiment, the housing 700 (FIG. 11A) includes two or more Interfaces. Including more than one Interface in a housing achieves greater communication capability. Another advantage of having multiple Interfaces in a single housing or system is that redundant or back-up systems are provided to achieve continued operation in the event of failure of one or more components of one Interface. For example, each housing 700 includes a plurality of fans, in one embodiment 8 fans, including at least one power supply cooling fan and a plurality of other cooling and ventilation fans. In one example system having a first Interface and a second Interface there are a total of 16 fans, 8 fans being associated with each Interface. In this embodiment the fan connector 830 connects the processor 802 to the fans of the first Interface.

In one embodiment the fan connector 830 provides power to the fans and monitors operation of the fans. One method of monitoring may comprise monitoring the fan speed (RPM) and current draw. If the speed of a fan falls outside a desired range, the fan may soon fail or will not provide the desired ventilation and cooling for the Interface. Excessive heat in the Interface may damage electronic components, hence fan operation is closely monitored. Fans may be equipped with internal RPM monitoring devices or an external device may be constructed as desired to monitor one or more aspects of fan operation.

The processor 802 includes hardware or software configured to monitor the fan data and take action if the data indicates problems with one or more fans. Action includes, but is not limited to, shutting off one or more fans and/or energizing one or more fans. The M/R system may optionally be notified if fan operation falls outside a desired operating range. Communication with the M/R system may be achieved via the Interface connectors 808A, 808B. It is contemplated that not all of the fans operate at the same time as some are maintained in reserve to provide more flexibility in maintaining temperature inside the Interface.

In one preferred embodiment, the processor 802 and the fans are configured to maintain positive pressure inside the Interface to prevent contaminants from entering. In one configuration the positive pressure inside the Interface is maintained at about ½ inch of water. In an effort to maintain positive pressure, if a fan is determined to be operating improperly, the fan can be shut down. In response to the shut down of a fan, a reserve fan can be turned on to compensate for the loss of pressure in the housing. In this manner the processor 802 monitors fan operation and may automatically turn off or turn on any of the fans of the housing 700.

In one configuration, the C/C system includes a pressure sensor (not shown) configured to monitor the pressure inside the. In one embodiment the C/C system includes variable speed fans that can be speed controlled by the processor 802 to maintain desired temperature or interior pressure. Operation of the fans to maintain desired temperature and pressure is discussed below.

It is further desired to maintain the temperature in the housing below a threshold to prevent thermal damage to the components of an Interface. To this end, the C/C system includes one or more temperature sensors located throughout the housing 700. The data from the one or more temperature sensors may comprise a single signal or alarm provided to the processor 802 if the temperature monitored by the temperature sensor exceeds the threshold temperature. The data from the one or more temperature sensors may comprise an actual indication of the temperature at the sensor. The temperature sensors provide data to the processor 802. The temperature sensors may comprise any type of temperature sensor. In one embodiment the output of the sensors connects to the Interface via the input/output ports 808A, 808B. Any number of temperature sensors may be located in the housing 700.

The processor 802 receives and monitors the data from the temperature sensors. In response to this data, the processor 802 analyzes the data to determine if the temperature is above or below temperature limits. The comparison can be made based on data stored within the processor 802 or in the memory 804. Operation of the processor in response to data from the temperature sensors in discussed in more detail below.

Figure 12B:
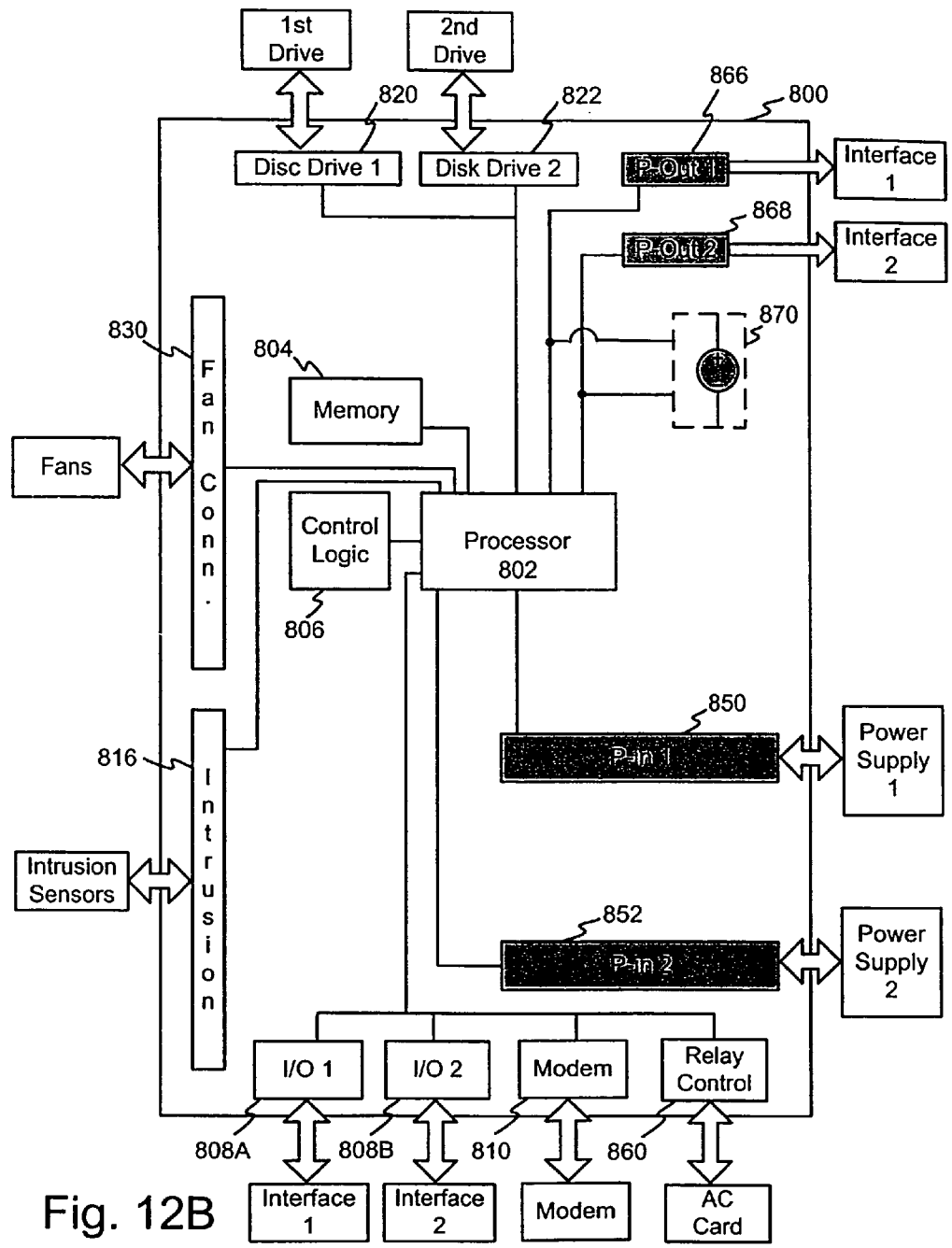
FIG. 12B illustrates a block diagram of an example configuration of a command and control system with associated apparatus.

FIG. 12B illustrates a block diagram of an example configuration of a command and control system including associated apparatus such as fans, temperature sensors, communications devices (such as an Interface), a modem, a AC distribution and control card, and media drives.

Power Control Systems

The C/C system includes power control systems to monitor and control power that is provided from the one or more power supplies to the one or more devices of the Interface and C/C system. As shown on FIG. 11A, the exemplary Interface described herein includes a first power supply 706 and a second power supply 708. A first power input coupling 850 and second power input coupling 852 connect to the first power supply 706 and the second power supply 708 respectively. The processor 802 monitors the power received from the power supplies via the one or more power couplings 850, 852. In one embodiment the processor 802 monitors the voltage level of the power supply output and the signal quality of the power supply output. It is contemplated that in other embodiments other aspects of the power output can be monitored.

The incoming power from the power supplies is routed to the control logic 806. The control logic 806 includes switches and control logic which may be entirely or in part controlled by the processor to selectively switch power from either of the power supplies to either of each Interface. The switches may comprise solid state switches or logic controlled relays. The switching system is configured to selectively route power from either of the power supplies to either of the Interfaces thereby providing backup power capability in the event a power supply fails. Hence, if the processor 802 determines the first power supply is failing, it will rout power from the second power supply to both the first and second Interface.

After passing through the switching portions of the control logic 806, the power flows to a first power output 866 and a second power output 868. The first power output 866, 868 comprises connectors configured to provide power to the first and second Interfaces from the switches of the control logic 806.

Thus, a re-boot of an Interface may be achieved in either of two ways, both of which may be executed from a remote location, such as the M/R system. One re-boot operation, referred to as a soft reboot occurs by the processor 802 sending an electronic re-boot signal via one of the Interface input/output connectors 808A or 808B depending on which Interface is to re-booted. The second re-boot operation, referred to as a hard re-boot occurs by the processor controlling the switch systems of the control logic to switch off or cut power that would other-wise flow to the Interface via one of the connectors 866 or 868. A short time later power can be re-supplied to the Interface.

In one embodiment, a battery 870 is also included in the power system of the C/C system. The battery 870 may comprise any type of battery capable of supplying a voltage to a load. Use of the battery is described below in greater detail. For purposes of understanding, the battery operates in conjunction with the power control system and the processor to provide short term back up in the event a power supply fails and the output of a different power supply must be rerouted to the Interface serviced by the failed power supply. The battery prevents power sags during the short period between failure and switching to a secondary supply.

It should be noted that the particular layout and configuration shown in FIG. 12A is provided for purposes of understanding and discussion. Other configurations or the addition of other couplings, controllers, processors, or sensors is contemplated. For example, in another embodiment the couplings and connectors shown in FIG. 12A may be replaced with or supplemented by a controller or logic configured to analyze the data provided from the sensors that are located throughout the Interface. Such an arrangement distributes the operation of the processor 802. In other embodiments the processor 802 is replaced by logic. In yet another embodiment the C/C system is implemented in software that is executed on an Interface.

Relays

Figure 13:
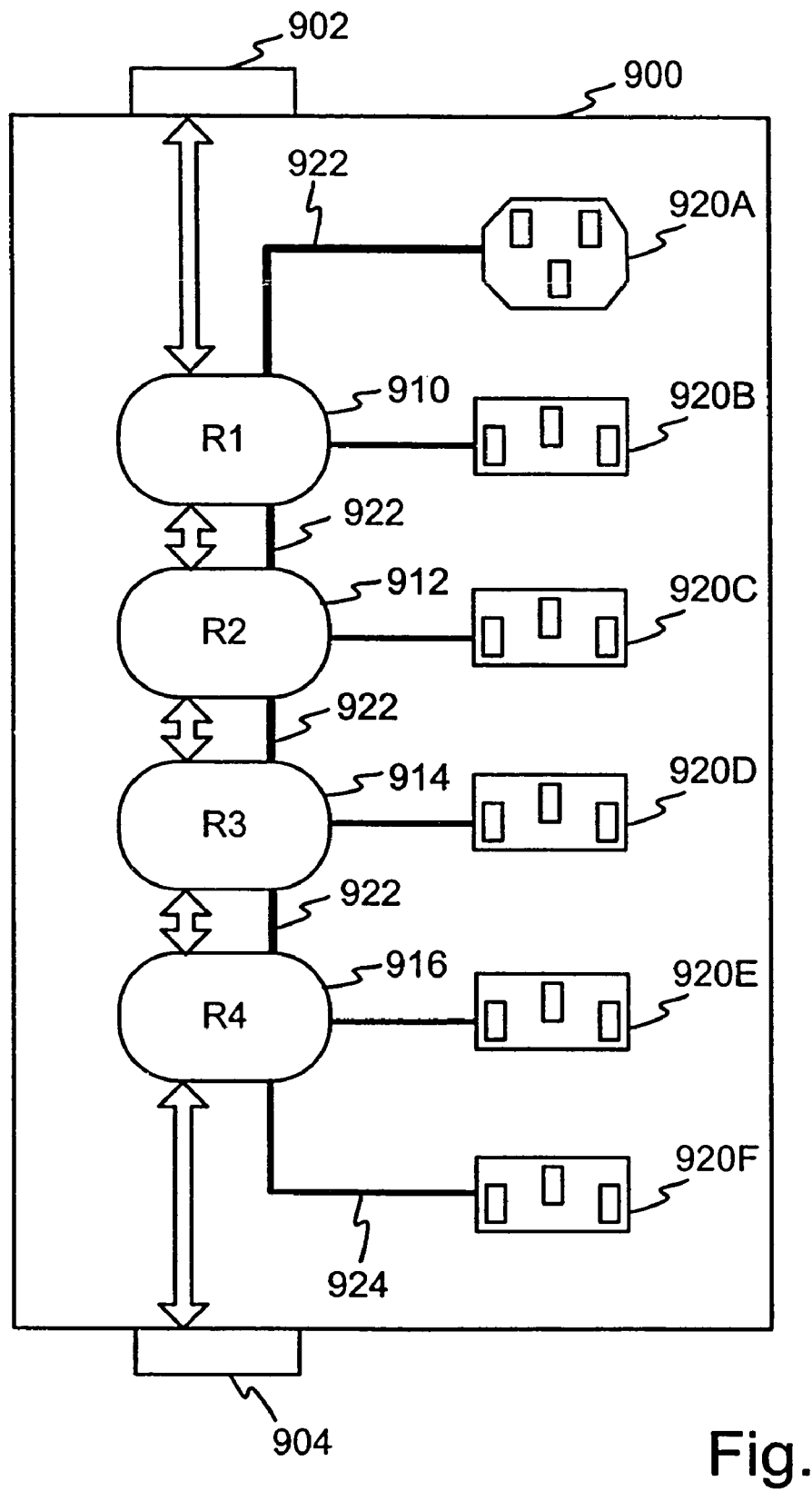
FIG. 13 illustrates a block diagram of an example configuration of an AC distribution card.

The processor 802 also connects to a relay control connector 860, the relay connector providing means for the processor to communication with and control the relays on the AC distribution card 900. The relay connector 860 connects to the AC distribution card 900, shown in FIG. 13. FIG. 13 illustrates a block diagram of an exemplary configuration of the AC distribution card 900 as adopted for use with the present invention. In contrast to the switching aspects of the control logic 806 that control power to an Interface, the relays control power supply from an AC power source to the one or more power supplies in the housing.

The relay connector 860 connects to an input 902 of the AC distribution card. The input 902 comprises an input for relay control lines and control signals. The control lines from the input 902 connect to each relay 910-916 and to output connector 904 so that additional relays boards may be connected together in daisy chain fashion.

The processor controls operation of the relays 910-916. In one configuration the relays comprise 12 volt, double-pole, double-throw, 120 volt, ⅓ Hp type relays available from Magnicraft & Struthers-Dunn located in North Field, Ill.

Also attached to the AC distribution card 900 is a plurality of sockets or receptacles. In this embodiment each of receptacles 920B-920F comprise female configuration standard power plugs. Receptacle 920A comprises a male configuration. Receptacle 920A and associated wiring is configured to receive a power input from a current source, such as a male plug connected to a wall ac outlet. Receptacle 920B connects to relay 910 and is configured to receive a plug from a first power supply, such as would supply power to a power supply of the first Interface. Receptacle 920C is similarly configured as plug 920B except that it connects to relay 912. It is configured to accept a male plug from a second power supply associated with a second Interface. Receptacle 920D and 920E are similarly configured but provide additional power source connections for other devices, such as disk drives, cooling fans, or other apparatus.

A power conductor 922 connects the input receptacle 920A in parallel fashion with each of the other receptacles 920B-920D. A relay resides between the power conductor 922 and each receptacle 920B-920E. For example, when relay 910 is energized it acts as a switch to control current flow in the power conductor 922 from reaching receptacle 920B. When relays 910-916 are de-energized, they allow power 922 to pass to receptacles 920B to 920E. A conductor 924 connects the power conductor 922 to the connector plug 920F so that the input power may be connected to another AC distribution card 900. The relays 910, in conjunction with the routing arrangement of the power conductors 922, are configured to selectively control the routing of input power to the housing power supplies and other equipment. This allows the C/C system to cut power to a malfunctioning power supply which in turn reduces the chance of a fire or other undesired event.

It is contemplated that the relay card 900 includes numerous traces as might be needed to interconnect the apparatuses of the relay card. The connections shown are only for purposes of discussion and are not intended as a complete trace layout. Various trace layouts are contemplated to achieve the goals as described and claimed.

In one embodiment the relay card 900 is further configured to selectively power down one or more of the Interfaces to thereby execute a re-boot of the one or more Interfaces. The processor 802 controls one or more relays 910 to disconnect power from one of the Interfaces to cause a re-boot. The processor 802 late controls the relays 910 to re-energize the Interface after a desired period of time, such as after the devices of the Interface have reset.

Operation of C/C System

In operation the C/C system performs many various functions to monitor the Interface and initiate appropriate responses to the monitored data. The following discussion and the accompanying figures explain one exemplary method of operation of one embodiment of the invention. Other methods of operation are contemplated.

Figure 14:
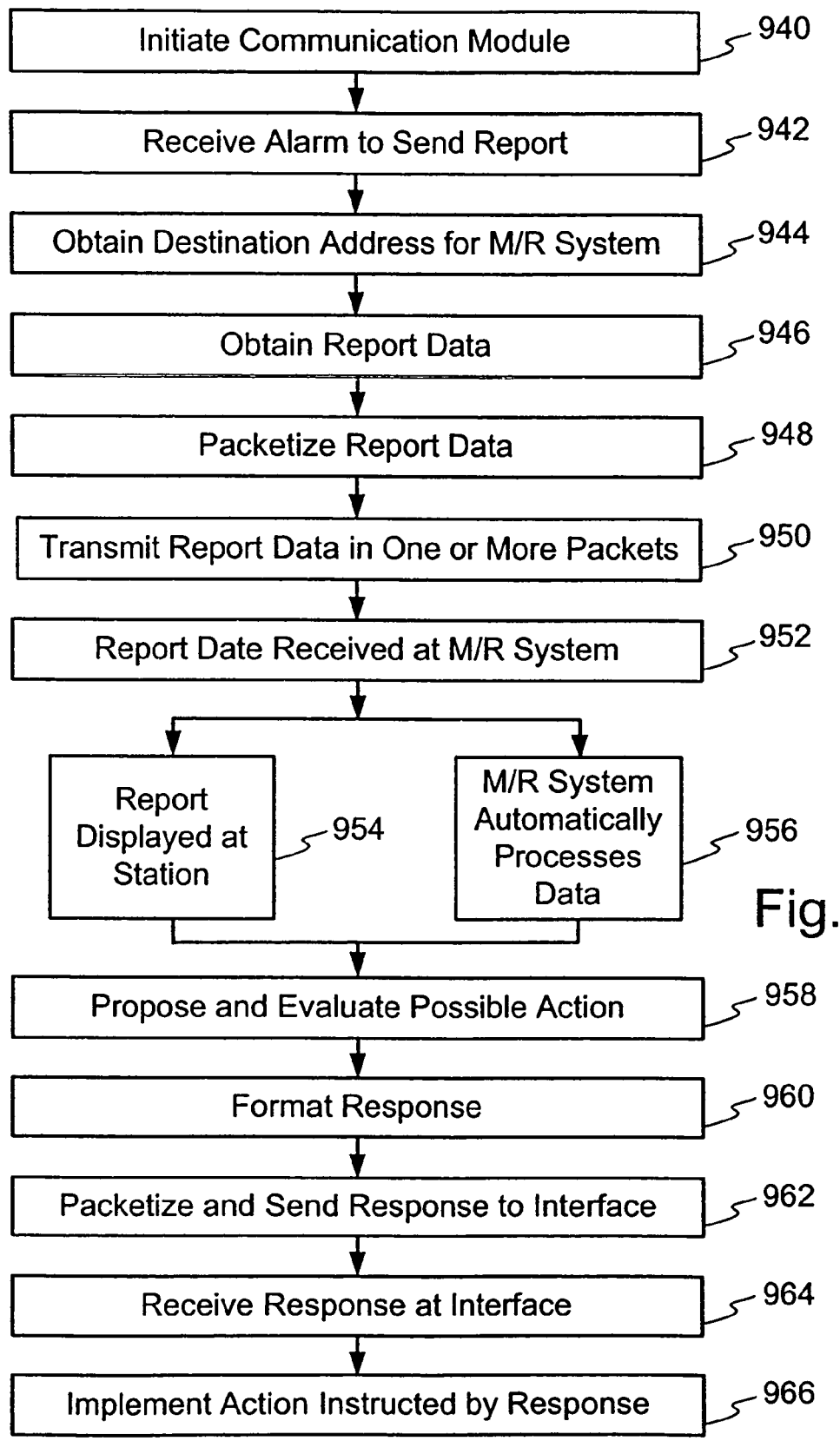
FIG. 14 illustrates an operational flow diagram of an example method of communication with a remote location.

One advantage of the invention is that the invention provides an ability for the C/C system to communicate with a remote location and from a remote location. The communication may be initiated by either the Interface or the remote location, such as a M/R system. One method of communication with a remote location is illustrated in the communication routine, shown in FIG. 14. This exemplary method initiates communication by the Interface, however in other embodiments the M/R system may initiate communication with the C/C system to obtain data regarding an aspect of the Interface or to control some part of the Interface or the C/C system from one or more remote locations.

At a step 940, operation of the communication module is initiated. Operation may occur automatically in response to an alarm or other monitored data or as part of a scheduled reporting operation. The communication module comprises a combination of hardware and software configured to receive data from the processor or one or more sensors and transmit the data via the Interface to the M/R system or other remote location. In one embodiment the processor with software executing thereon comprises the hardware and software of the communication module.

Next, at a step 942, the communication module receives an alarm or other indication to send a report to a remote location (report destination). At a step 944 the communication module obtains the desired address of the report destination. In one embodiment the report destination is the M/R system. Thereafter, at a step 946, the data regarding the Interface is obtained from the various sensors, memory registers, or processor cache, to send to the remote location, and, at a step 948, the report data is packetized into one or more packets for transmission over a packet switched network, step 950. The report may contain information regarding any one or more aspects of the Interface including all monitored aspects discussed herein.

Subsequently, at a step 952 the report data is received at the report destination, in this embodiment the M/R system. Two events my occur at this point, at a step 954, the M/R system displays the report data at a station or screen of the M/R system, and at a step 956, the M/R system analyzes the report data to generate various responses.

At a step 958, the M/R system proposes and displays possible action to take in response to the report. The proposed action depends on the content of the received report. The contents of the received report depends on the event at the Interface. Some of the various types of report data and possible responses are discussed below in conjunction with the various systems that are monitored.

Based on the possible action, the M/R system or individuals at the M/R system will format a proposed response to the report data and the proposed solutions. This occurs at a step 960. The response may comprise sending a service technician or security personal to the reporting Interface. Another response may comprise sending a control message to the Interface to control one or more aspects of the Interface.

In the event the response comprises a control message to the Interface, the M/R system or technician formulates the control message, and at a step 962 packetized and sends the response to the Interface. Thereafter, the Interface receives the response, at a step 964, and, at a step 966, implements the action defined by the control message on the Interface. Some of the various actions that can be taken in response to a report are discussed below in conjunction with the discussion for each type of activity or aspect of the Interface monitored by the C/C system.

Figure 15:
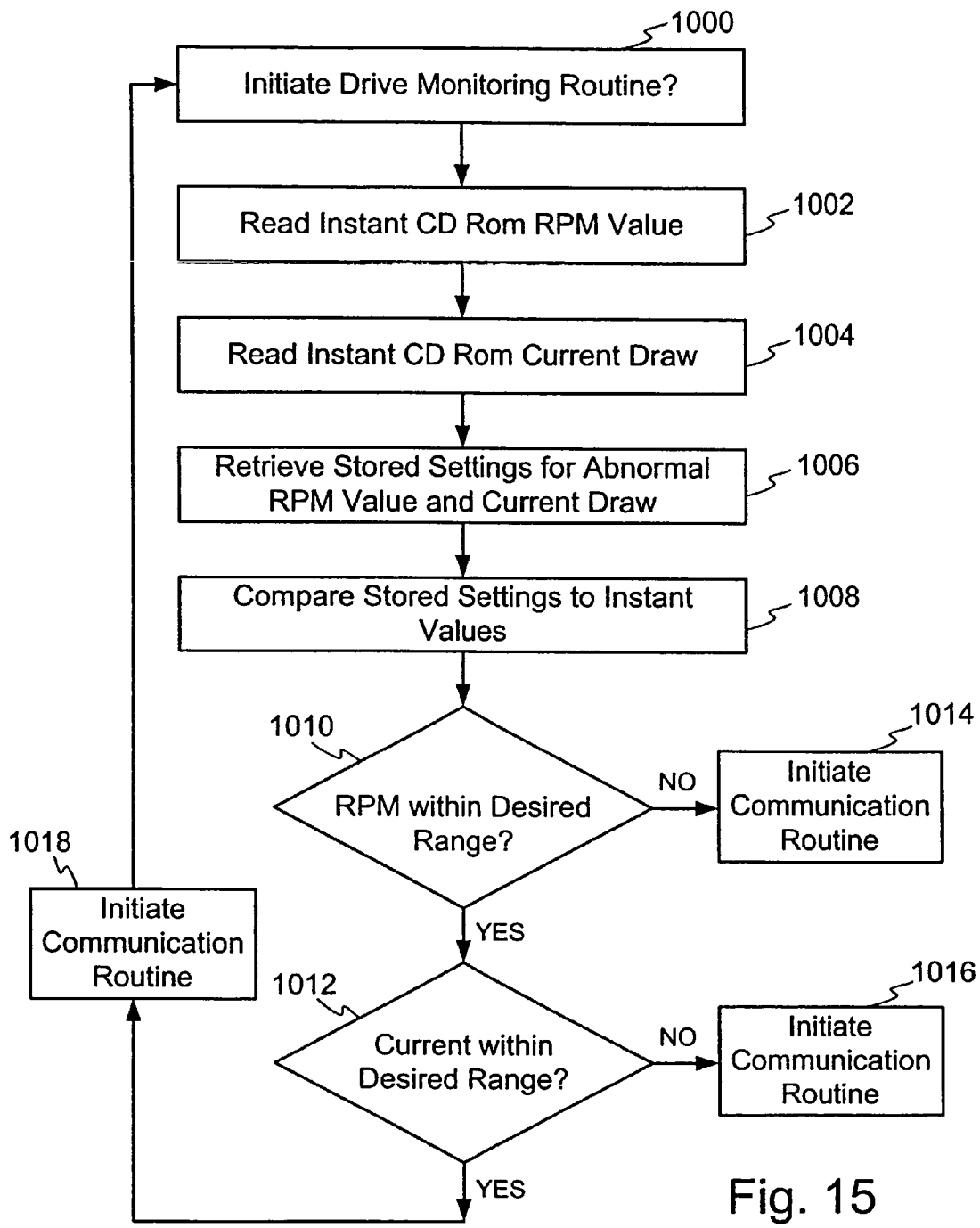
FIG. 15 illustrates an operational flow diagram of an example method of monitoring a media reader.

Turning now to FIG. 15, an operational flow diagram of a method of monitoring a media reader is shown. In this method, a compact disc ROM drive is monitored. At a step 1000 the operation initiates the monitor drive routine. This step may occur when the Interface is initially powered up or at various times during the operation of the Interface. Alternatively, the process may be initiated by the M/R system. After initialization and at a step 1002, the drive monitoring operation obtains from a sensor the instant drive speed. This is often provided in rotations per minute (RPM). Variations in speed may be an indicator of malfunction or upcoming failure.

Next, at a step 1004, the operation obtains the instant current draw of the drive. Erratic current draw by a drive may indicate upcoming failure. After obtaining these values, the operation progresses to a step 1006 wherein the system retrieves from memory the desired operating range for drive speed and drive current draw.

After retrieving these values, the operation, at a step 1008, compares the stored settings to the instant values. It is desired to have both the instant speed value and the instant voltage value within the range of desired operating values that are stored in memory. Hence, at a step 1010, the operation determines if the instant operating speed, or the speed when the reading was taken, is within the desired range. If the speed is not within the desired range the operation progresses to a step 1014 and the speed of the drive is presented to the communication routine described above. In this manner the M/R system or some other location or apparatus is notified so action can be taken.

If at step 1010, the instant drive speed is within the desire range, the operation progresses to a step 1012. At step 1012, the operation determines if the instant drive current is within the desired current range for the drive. If the instant drive current is not within the desired range, the operation progresses to a step 1016. At step 1016, the operation presents the instant drive current to the communication routine for transmission to the M/R system or some other location so that action can be taken. If at step 1012 the instant drive current is within the desired range, then the operation may either continue the monitoring and compare process or end until re-initiated. At an optional step 1018, the C/C system may initiate the communication routine to notify the M/R system that the drive is operating in a desired manner.

Figure 16:
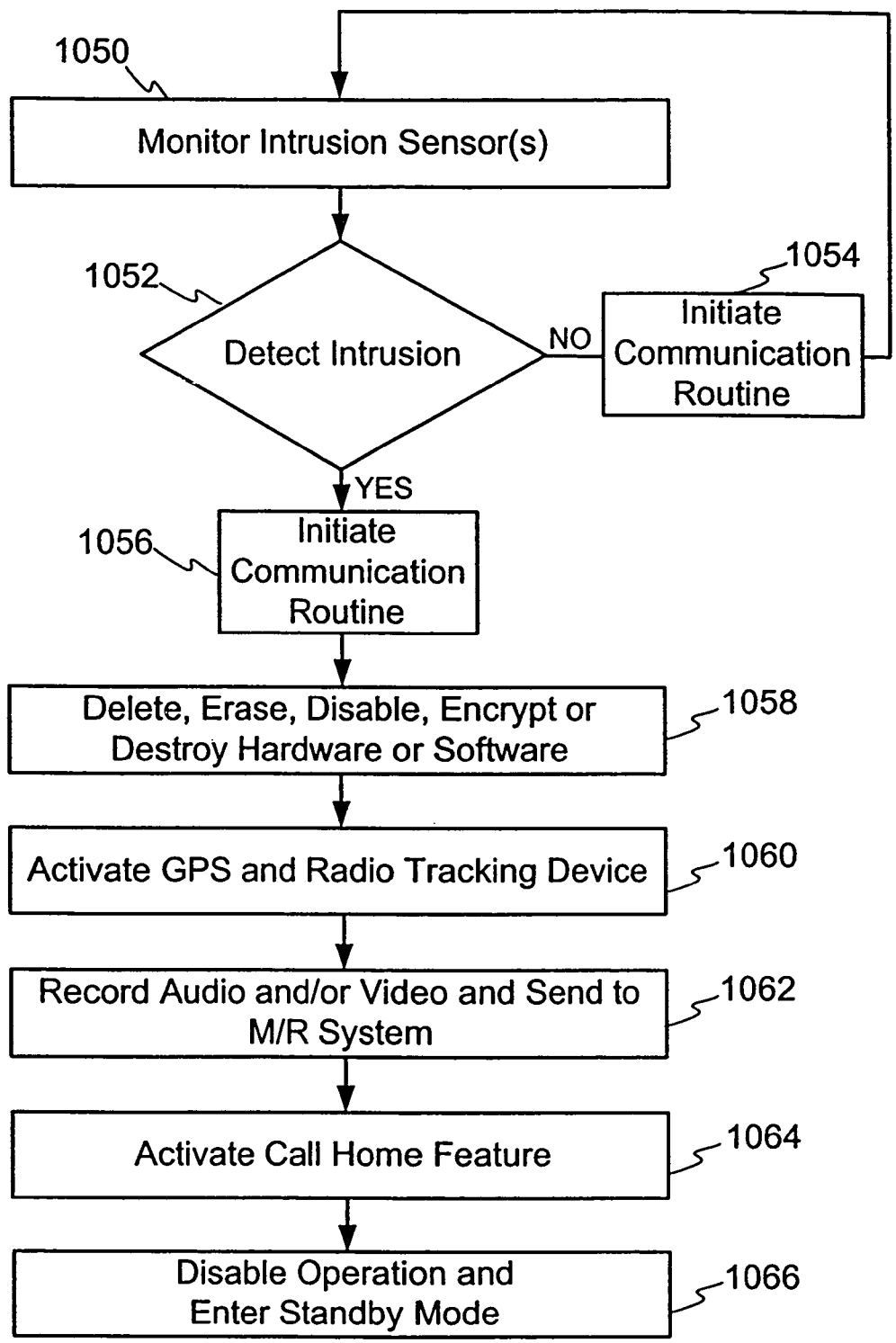
FIG. 16 illustrates an operational flow diagram of an example method of monitoring intrusion sensors.

In reference to FIG. 16, an operational flow diagram of an example method of monitoring and reporting intrusion sensors is shown and described. At a step 1050, the operation may initiate monitoring of the one or more intrusion sensors located in the Interface. As described above, the sensors may comprise any sensor that signals an opening of the housing or of a panel, or any motion detection sensors that detect motion of the Interface.

At decision step 1052, a determination is made regarding if the sensors have reported an intrusion. If no intrusion was reported or signaled by the sensors, then the operation progresses to an optional step 1054. At step 1054 the intrusion detection routine initiates the communication routine to notify the M/R system that an intrusion was not detected. Reports may be provided to the M/R system even when intrusion is not detected to provide further security. Thus, if a report of "no intrusion" is not received from the Interface, it can be assumed that the Interface has been tampered with and action can be taken. Stated another way, if the M/R system does not receive a report, it is assumed an intrusion has occurred. After step 1054, the operation returns to step 1050 and the process repeats.

If at step 1052, the decision step detects an intrusion, the operation progresses to a step 1056. At step 1056, the operation initiates the communication routine to provide a report to the M/R system indicating an unauthorized intrusion has occurred. It is contemplated that the intrusion system can be disabled to allow for authorized service of the Interface.

Next, at a step 1058, the operation may optionally take action to protect the contents of the Interface. Such protective action includes, but is not limited to, deletion or encryption of some or all data stored on the Interface, or disabling or destroying various hardware in the Interface.

At an optional step 1060, the system may enable one or more G.P.S. or radio tracking devices as might be built into the Interface to aid in recovery of a stolen Interface or component. At an optional step 1062, the operation initiates audio or video recording device to provide a record of the party or parties activating the sensor devices. This data can be transmitted to the M/R system.

Thereafter, at step 1064, the operation may activate a call home feature that queues one or more reports or message designed to be sent from the Interface to the M/R system if the Interface is moved or stolen. The call home feature enables the Interface to contact the M/R system when restarted.

It is contemplated that if an intrusion is detected the operation of the Interface may be disabled and enters standby mode until the intrusion alarm can be addressed by the M/R system. It is contemplated that in one embodiment, the M/R system can send a control message to the Interface to re-set the intrusion alarm and re-initiate operation of the Interface.

Figure 17:
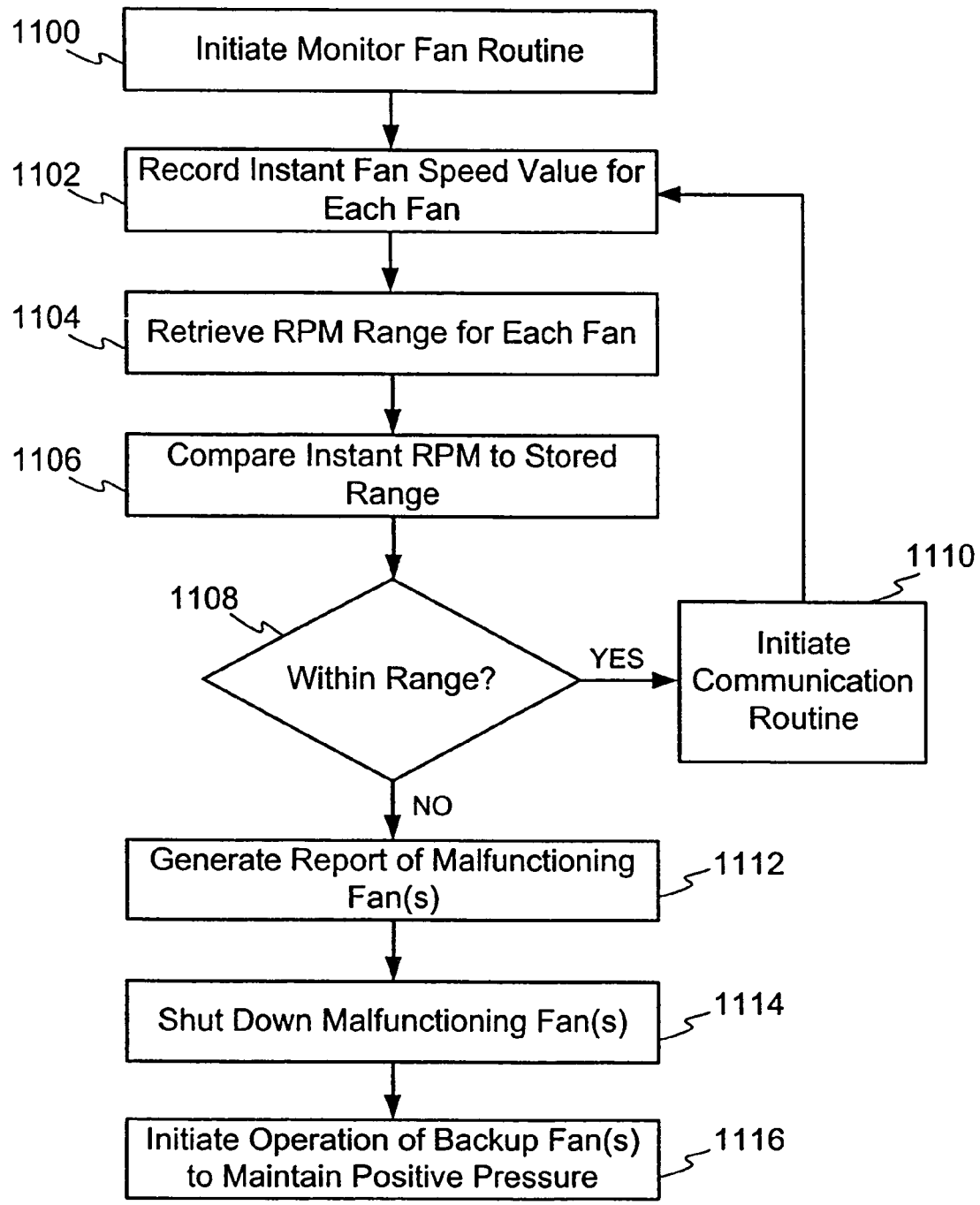
FIG. 17 illustrates an operational flow diagram of an example method of monitoring and controlling one or more ventilating devices of an Interface.

In one embodiment, the C/C system includes means to monitor and control the cooling and ventilation to the Interface. FIG. 17 illustrates an operational flow diagram of an example method of monitoring and/or controlling one or more fans of the Interface. At a step 1100 the operation begins monitoring the one or more fans (hereafter fans). This process may be initiated periodically during operation of the Interface or occur continually after startup or re-boot of the Interface. In this embodiment the fan monitoring routine monitors the speed, in rpm, of the one or more fans. In other embodiments other aspects of the fans may be monitored. At a step 1102, the operation records the instant fan speed value for each monitored fan. It is contemplated that all fans be monitored, even if not operating, to provide indication of the status of each fan.

Next, at a step 1104, the operation retrieves from memory a desired speed value or range for each monitored fan. The desired speed range comprises a maximum and minimum value between which the speed of the fan should preferably operate.

At a step 1106, the operation compares the instant fan speed to the desired fan speed range retrieved from memory.

At a decision step 1108, the operation determines if the instant fan speed falls within the desired range. If at decision step 1108 the fan speed is within the range, the operation progresses to an optional step 1110. At step 1110, the operation may optionally initiate the communication routine to notify the M/R system that the one or more fans are operating within a desired speed range. It is contemplated that a report be sent to the M/R system indicating which of the one or more fans are operating as desired, that is, within the defined speed range. After step 1110, the operation returns to step 1102, to initiate further fan speed monitoring.

If at decision step 1108 one or more of the fans are not operating within the desired speed range, the operation progresses to a step 1112. At step 1112, the operation generates a report indicating which of the one or more monitored fans is not operating properly. Next, at step 1114, the C/C system may or may not shut down the malfunctioning fans. This prevents other problems from arising, such as fire or short-circuits, and allows other action to be taken.

Thereafter, at a step 1116, the C/C system analyzes which of the one or more fans has been shut down and initiates operation of other fans to compensate for the shut down of the one or more fans. This action maintains the desired positive pressure within the Interface. In an alternative embodiment the C/C system awaits instruction from the M/R system before taking any action. Thus, in such an embodiment the M/R system determines which of the one or more fans should properly be energized to achieve desired operation. This process may continue in the manner described above.

Figure 18:
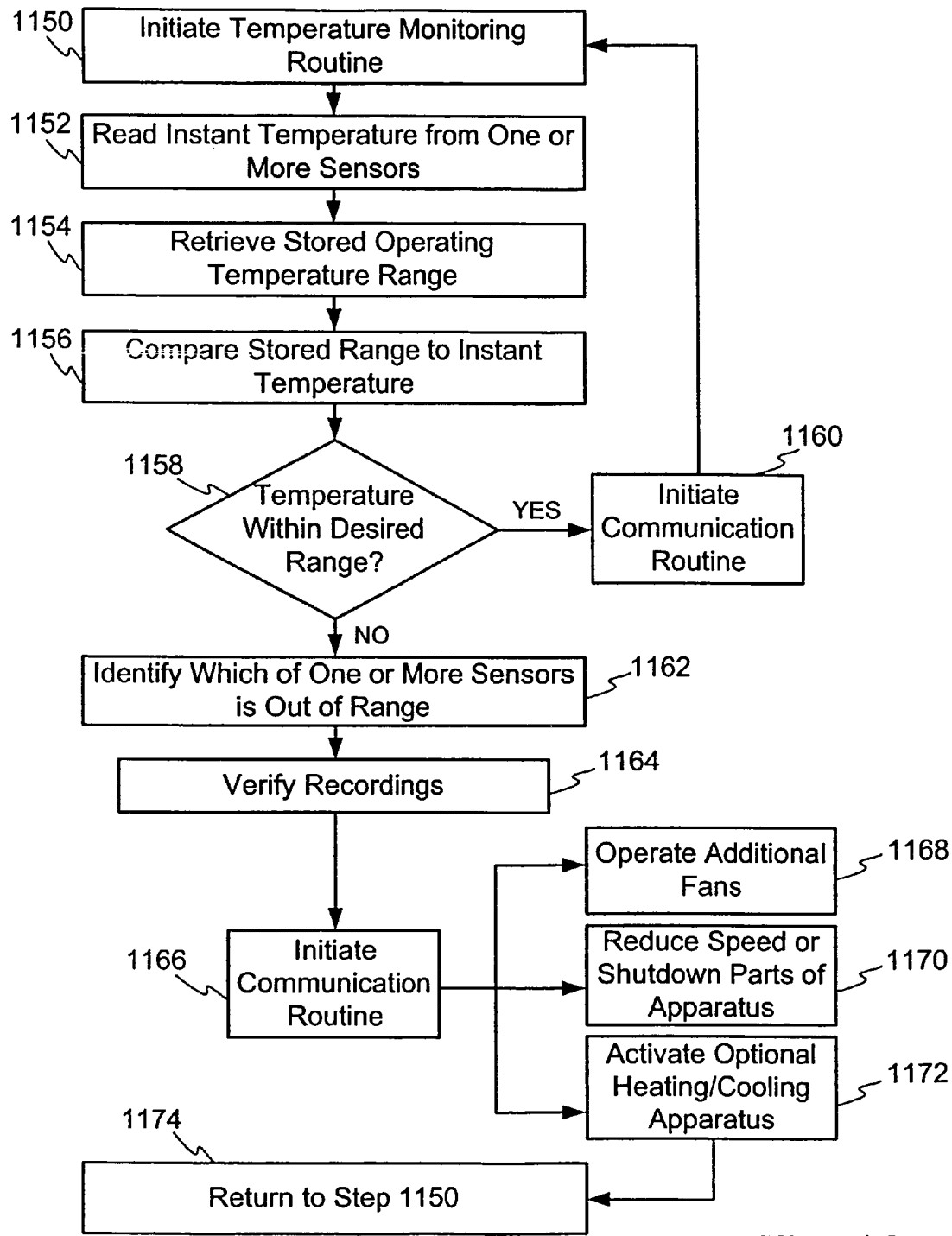
FIG. 18 illustrates an operational flow diagram of an example method of temperature monitoring.

Turning now to FIG. 18, an operation flow diagram of an exemplary method for temperature monitoring is shown. At a step 1150 the operation initiates the temperature monitoring routine. The temperature monitoring routine may occur periodically or continually after startup or upon reboot. Next, at a step 1152, the operation obtains the instant temperature at the one or more monitored locations within the Interface or exterior to the Interface. It is contemplated that one or more temperature sensors are used to obtain temperature data.

After obtaining the instant temperature data, the operation, at a step 1154, retrieves stored data from memory indicating a desired temperature range for each temperature sensor providing temperature data. Next, at a step 1156, the operation compares the instant temperature value to the stored data of the desired temperature range(s). At decision step 1158, the temperature monitoring routine determines if the one or more monitored temperatures fall within the desired range of temperatures. For those sensor readings that fall within the desired range, the operation progresses to an optional step 1160, wherein the communication routine (described above) is initiated. The system generates a report regarding temperature sensor data that falls within the desired range. The M/R system receives this data and is thus notified of desired operation.

Alternatively, if at decision step 1158 it is determined that one or more of the temperature sensors are providing temperature readings that do not fall within the desired temperature range, then the operation progresses to a step 1162. At a step 1162, the operation identifies the one or more sensors providing temperature data that does not fall within the range for that particular sensor. Next, at a step 1164, the C/C system may optionally take additional readings to verify that the temperature data is consistent.

If the temperature data is accurate, then at a step 1166, the operation initiates the communication routine to provide the temperature data to the M/R system. The M/R system may take action in the form of a control message instructing the Interface to initiate operation of additional fans to reduce or increase the reported temperature, step 1168. Alternatively, the C/C system may be programed to automatically take steps to alter the temperature within the Interface. In one embodiment, the C/C system turns on or off addition fans in pairs or some other desired combination to maintain positive pressure at the interior of the Interface.

Thereafter, additional monitoring may occur and at a step 1170, the C/C system may reduce the speed or shut down portions of the Interface to reduce the amount of heat generated by the Interface. If after additional monitoring the temperature is not within the desired range, then, at a step 1172, the C/C system may initiate operation of supplemental heating or cooling apparatus (not shown) as necessary to maintain a desired temperature. The operation progresses to a step 1174 and the operation continues monitoring the data from the temperature sensors in the manner described above. This is but one possible method for monitoring temperature in a communication device, such as an Interface. It is further contemplated that temperature sensors dedicated to a single device or chip may be included. For example, a single sensor may monitor a single integrated circuit.

Figure 19A:
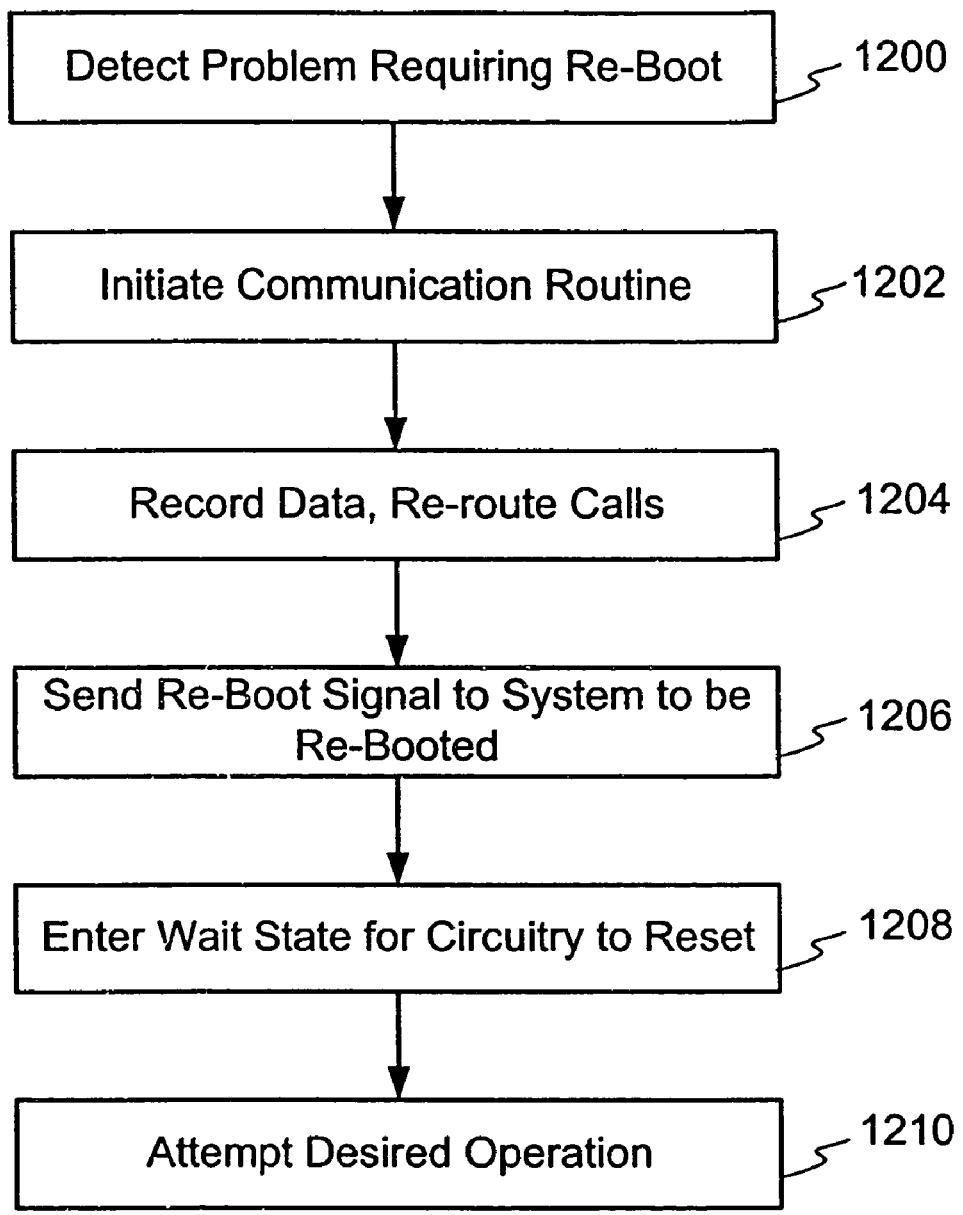
FIG. 19A illustrates an operational flow diagram of an example method of a soft re-boot operation.

As can occur with an electronic device, a reboot may be necessary. FIG. 19A illustrates an operational flow diagram of a soft re-boot routine. A soft re-boot operation, in contrast to a hard re-boot operation is initiated by a electronic signal. A hard re-boot is initiated by power-down and power-up the system. At a step 1200, the C/C system detects or is notified of a need to re-boot an Interface. In one embodiment the notification to re-boot arrives from the C/C system, while in another embodiment the notification to re-boot arrives from the M/R system.

Next, at a step 1202, the re-boot routine initiates the communication routine to notify the M/R system or some other remote location of the upcoming re-boot operation. At a step 1204 the C/C system may request that the Interface record data or re-route any existing communication links still operating before re-booting.

The re-boot routine then progresses to a step 1206 by sending a signal to the Interface or other device to be re-booted. In one embodiment the soft re-boot occurs by presenting a signal to the re-set logic or pin of the electronics of the Interface.

Next, at a step 1208, the re-boot routine enters a wait state to allow the circuitry to reset and the re-boot to fully occur. After a period of time has passed, the operation progresses to a step 1210. At step 1210, the processor of the C/C system initiates operation of the re-booted device to restore operation.

Figure 19B:
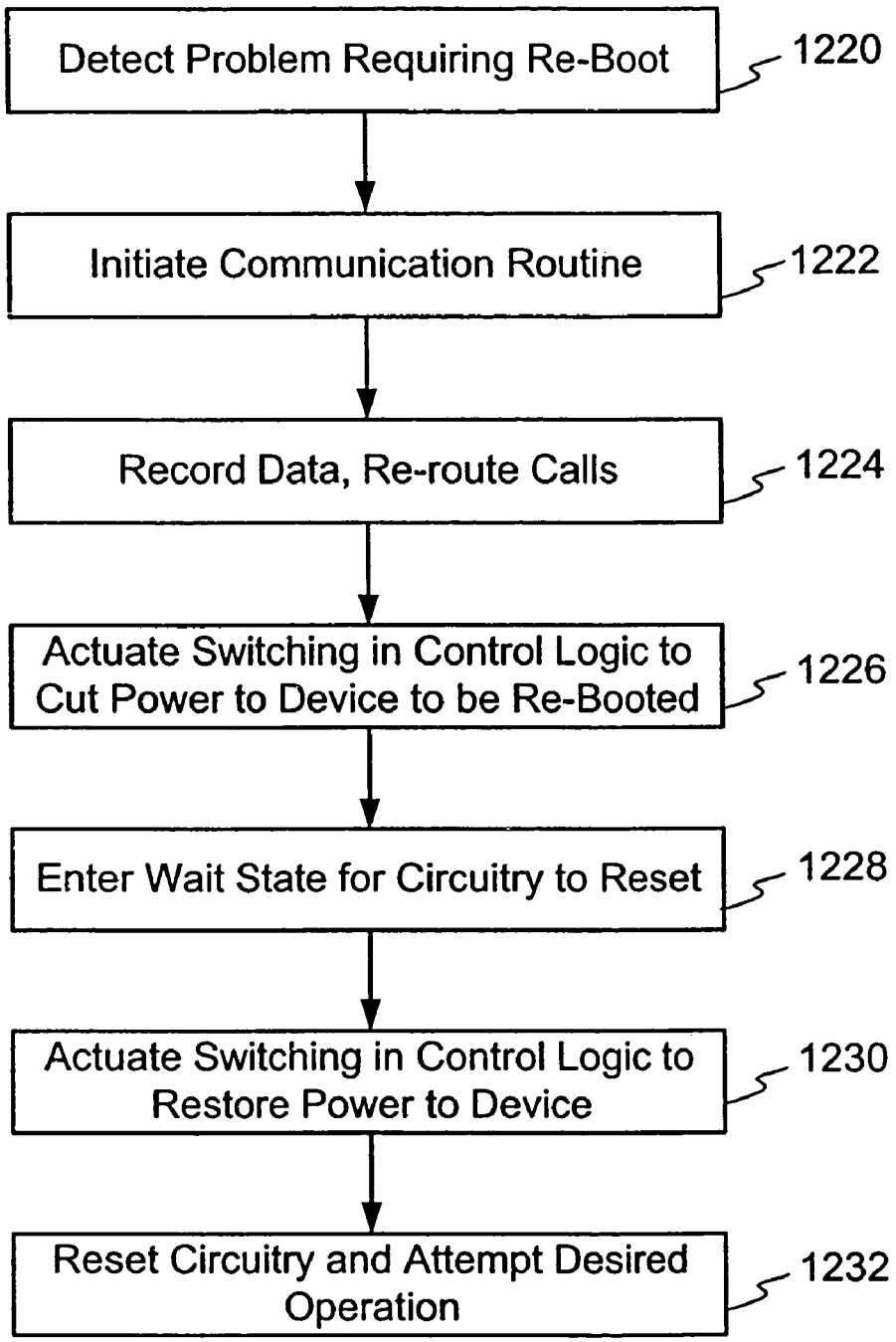
FIG. 19B illustrates an operational flow diagram of an example method of a hard re-boot operation.

FIG. 19B illustrates an operational flow diagram of a hard re-boot routine. A hard re-boot operation, in contrast to a soft re-boot operation is initiated by powering down the device and then a short time later powering up the device again. This resets the circuitry of integrated circuits of the re-booted device. At a step 1220, the C/C system detects or is notified of a need to re-boot an Interface. In one embodiment the notification to re-boot arrives from a multi-interface system, while in another embodiment the notification to re-boot arrives from the M/R system.

Next, at a step 1222, the re-boot routine initiates the communication routine to notify the M/R system or some other remote location of the upcoming re-boot operation. At a step 1224 the C/C system may request that the Interface record data or re-route any existing communication links still operating before re-booting.

The re-boot routine then progresses to a step 1226 by controlling one or more switching devices in the control logic (806, FIG. 12A) to stop power flow to the device to be re-booted. In one configuration, the device to be re-booted is an Interface. The control logic or the processor may control the switching devices. The switching devices may comprise solid state switches, relays, transistors or any other device capable of controlling power flow.

Next, at a step 1228, the re-boot routine enters a wait state to allow the circuitry to reset and the re-boot to fully occur. Power is not provided to the Interface during the wait state. After a period of time has passed, the operation progresses to a step 1230. At step 1230, the C/C system restores power to the re-booted device to initiate operation. Restoring power resets the circuitry, step 1232, so that operation may occur.

Figure 20:
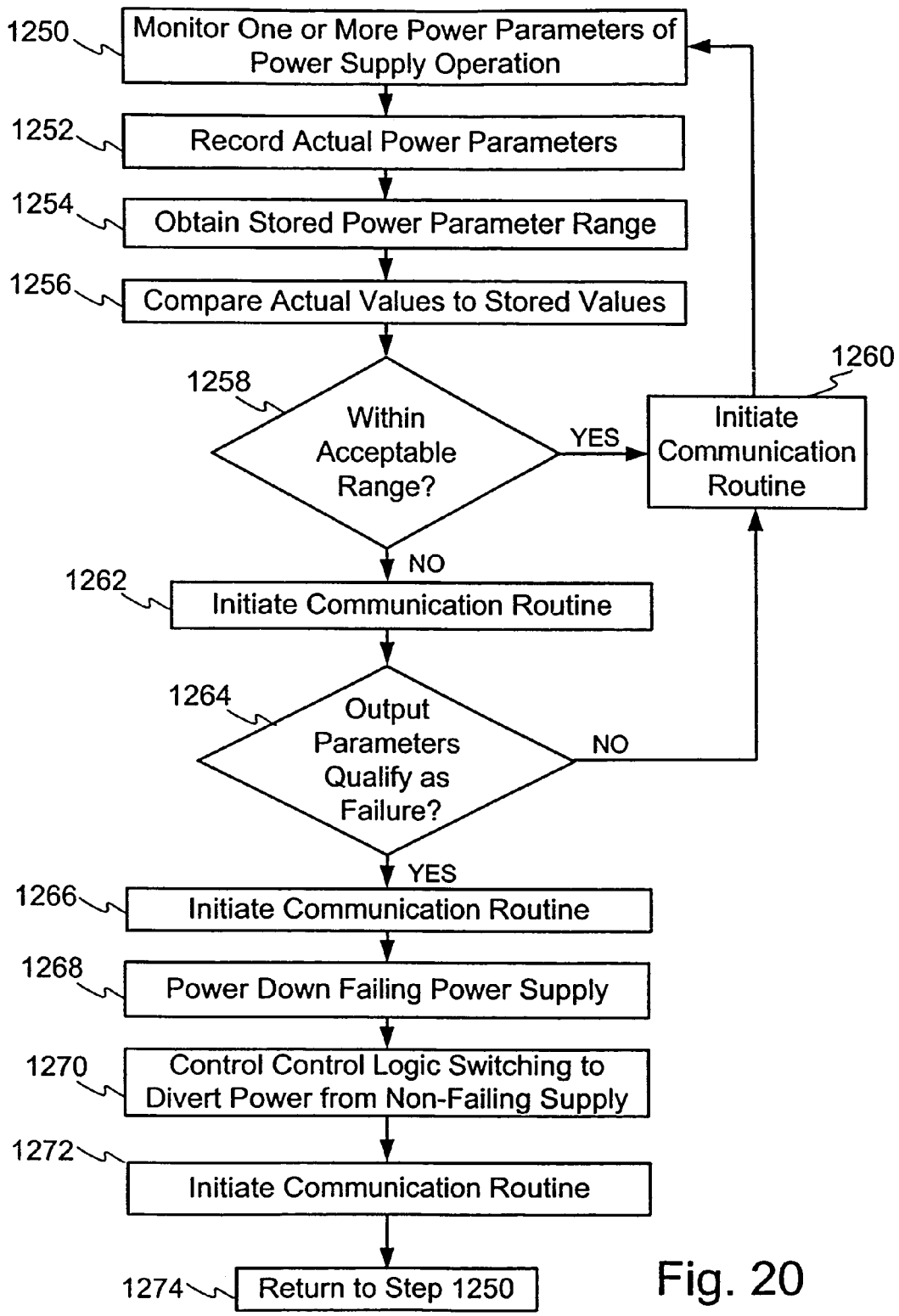
FIG. 20 illustrates an operational flow diagram of an example method of power supply output monitoring and distribution control.

Another aspect of the invention comprises monitoring of the power supply output to maintain desired operation of the one or more systems of the Interface. FIG. 20 illustrates an operational flow diagram of an example method of power supply output monitoring. At a step 1250, the power monitoring routine begins operation by monitoring one or more parameters of power supply operation. The monitored parameters may include, but are not limited to, voltage, current, frequency, and noise.

At a step 1252, the C/C system records the actual value of the one or more power parameters being monitored. These actual parameter values may comprise the actual parameter value or an average over time of the parameter value. The power output is monitored using one or more various solid state devices that are part of the C/C system. It should be noted that the term 'instant' parameter value is used to avoid confusion with the power parameter of current flow.

Thereafter, the C/C system retrieves one or more stored power supply parameter ranges from memory. This occurs at a step 1254. The stored power parameter ranges comprises a desired range of values that the monitored power parameters should fall within. If the monitored parameters fall outside of these ranges, there may be an indication of a faulty power supply. If the monitored parameters fall outside of these stored parameter ranges then the power supplied to the systems of the Interface may not meet specification. As a result, the systems could be damaged or not achieve proper operation.

At a step 1256, the C/C system compares the actual parameter values to the parameter ranges stored in memory. It is contemplated that more than one parameter may be compared. In one embodiment, the processor of the C/C system performs the compare operation. Based on the compare step at 1256, the C/C system enters decision step 1258 to determine if the one or more parameters fall within the one or more desired ranges. In other embodiments, the actual power supply parameter may be compared to a single value. Data comparisons are known by those of ordinary skill in the art. If the actual parameter is within a desired range, then the operation progresses to a step 1260. At step 1260, the C/C system may optionally initiate the communication routine to send a report to the M/R system to thereby provide notification of the power parameters that fall within the specified desired range. Thereafter, the operation returns to step 1250 to continue monitoring the data.

Alternatively, if at step 1258 it is determined that certain of the monitored parameter values do not fall within the desired range of parameter values, then the operation progresses to a step 1262 to initiate the communication routine to send a report of the parameters that are not within specification to the M/R system. Next, at a decision step 1264, the C/C system determines if the parameters that fall outside of the desired range qualify as power 'failure' indicators. This is referred to herein as an alarm indication. An alarm indication is an indication from the monitoring routine described above that requires re-routing of power from one or more other power supplies to compensate for the undesired power output of one of the other power supplies. By way of example, if a power supply output voltage significantly drops, the system supplied with power from the failing power supply will not be supplied sufficient voltage to operate. Thus, in an alarm situation, additional power must be supplied to the system supplied by the failing power supply.

If at decision step 1264, the C/C system determines that the parameter out of range indication does not qualify as an alarm, the operation returns to a step 1260. The power supply continues operation and monitoring continues.

Alternatively if the parameter out of range indication from step 1258 is determined at step 1264 to qualify as a failure, then the operation progresses to a step 1266. At step 1266, the C/C system initiates the communication routine to notify the M/R system of the failure condition. Thereafter, at step 1268, the C/C system powers down the malfunctioning power supply. This prevents further harm to the systems of the Interface or the power supply. In one embodiment the C/C system utilizes the switching capability of one or more relays on the AC distribution card to selectively power down one or more of the power supplies that is malfunctioning. Signals are sent to the AC distribution card via the relay control connector 860.

After power-down occurs, or simultaneously therewith, the C/C system actuates relays or other switching mechanisms to divert power from one or more of the non-failing power supplies to the systems served by the one or more failing power supplies. This occurs at a step 1270. In an alternative embodiment, back-up power supplies may be adopted for use. The order of step 1268 and step 1270 may be reversed.

As an advantage of the present invention, the C/C system includes a battery 870 (FIG. 12A) that is included in the current path from at least one of the power supplies to the systems provided with power from the at least one power supply. As can occur with even the fastest monitoring systems, the time period between the sensing of failure situation and the supplying of power from an alternative source may be sufficient for an interruption of power to the supplied systems to occur. The battery 870 (FIG. 12A) of the C/C system advantageously provides sufficient current and voltage for the systems to continue operation in the event of such an interruption in power when the solid state devices or other apparatuses are performing switching in reaction to a power failure. This occurs automatically or as part of the switching process.

Next, at a step 1272, the C/C system initiates the communication routine to generate a report to the M/R system or some other remote location. The report provides notification that power has been routed from a functioning power supply to systems that were previously provided power by a power supply that is now shut down or not operating. At a step 1274, the operation returns to monitoring the output of the remaining power supplies that are still in operation. It is contemplated that the processor of the C/C system execute the steps of the power supply monitoring routine. In other embodiments, the entire routine or only parts thereof, may be implemented in hardware and/or software.

It will be understood that the above described arrangements of apparatus and the method therefrom are merely illustrative of applications of the principles of this invention and many other embodiments and modifications may be made without departing from the spirit and scope of the invention as defined in the claims.

I claim:

1. A system to maintain call quality over a packet switched network comprising:
   a command and control system configured to monitor at least one parameter affecting functioning of one or more path interface devices through which calls are directed;
   a monitoring and routing system at a remote location for monitoring a plurality of command and control systems and for routing calls between the path interface devices;
   said command and control system comprising a processor to compare a value of the at least one parameter to a stored range or threshold and to generate an alarm signal in response to a value of said comparison;
   said command and control system being further operable to transmit a condition-responsive report to said monitoring and routing system in the absence of an alarm condition, said monitoring and routing system analyzing data from each command and control system to generate responses thereto, and
   said monitoring and routing system being responsive to the alarm signal to produce and transmit a signal indicative of a proposed action to affect the at least one parameter at said command and control system producing the alarm signal.

2. The system according to claim 1, wherein said monitoring system comprises means for providing the signal indicative of the proposed action to said command and control system and wherein said command and control system in response to the signal indicative of the proposed action controls a means to affect the at least one parameter.

3. The system according to claim 2, wherein the at least one parameter is temperature.

4. The system according to claim 3, wherein said means to affect the at least one parameter is a fan.

5. The system of claim 2, wherein said command and control system is housed in a pressurized housing pressurized by a fan and the at least one parameter comprises fan speed.

6. The system of claim 2, wherein the at least one parameter comprises power supplied to said interface and said means for affecting the at least one parameter comprises a switching means responsive to a failure of a power supply to said command and control unit to switch alternative power thereto.

7. The system according to claim 1, wherein said signal indicative of a proposed action to affect the at least one parameter at said command and control system producing the alarm signal comprises a signal to command dispatch of a repair technician.

8. A method to maintain call quality over a packet switched network comprising:
   monitoring with a command and control system at least one parameter affecting functioning of one or more path interface devices through which calls are directed, said command and control system comprising a processor to compare a value of the at least one parameter to a stored range or threshold; providing a monitoring and routing system at a remote location for monitoring a plurality of command and control systems and for routing calls between the path interface devices;
   generating an alarm signal in response to a value of said comparison and providing said alarm signal to said monitoring and routing system;
   operating said command and control system to transmit a condition-responsive report to said monitoring and routing system in the absence of an alarm condition;
   analyzing at said monitoring and routing system data from each command and control system to generate responses thereto; and
   providing from said monitoring and routing system in response to the alarm signal a signal indicative of a proposed action; and
   transmitting the signal indicative of a proposed action to affect the at least one parameter at said command and control system producing the alarm signal.

9. The method of claim 8, further comprising operating said command and control system in response to the signal indicative of the proposed action to affect the at least one parameter.

10. The method of claim 8, wherein providing from said monitoring and routing system in response to said alarm signal a signal indicative of a proposed action and transmitting a signal indicative of a proposed action to affect the at least one parameter at said command and control system producing the alarm signal comprises producing a signal to command dispatch of a repair technician.

11. The method according to claim 8, wherein the at least one parameter is temperature.

12. The method according to claim 11, wherein said means to affect the at least one parameter is a fan.

13. The method of claim 8, wherein said command and control system is housed in a pressurized housing pressurized by a fan and the at least one parameter comprises fan speed.

14. The method of claim 8, wherein said at least one parameter comprises power supplied to said interface and said means for affecting said at least one parameter comprises a switching means responsive to a failure of a power supply to said command and control unit to switch alternative power thereto.

* * * * *